(12) United States Patent
Hasegawa

(10) Patent No.: US 12,104,680 B2
(45) Date of Patent: Oct. 1, 2024

(54) DRIVE TRANSMISSION DEVICE, FIXING DEVICE, AND IMAGE FORMING APPARATUS

(71) Applicant: CANON KABUSHIKI KAISHA, Tokyo (JP)

(72) Inventor: Takuya Hasegawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/450,872

(22) Filed: Aug. 16, 2023

(65) Prior Publication Data
US 2024/0094666 A1 Mar. 21, 2024

(30) Foreign Application Priority Data
Sep. 16, 2022 (JP) ................ 2022-147897

(51) Int. Cl.
*G03G 15/20* (2006.01)
*F16H 29/12* (2006.01)
*G03G 21/16* (2006.01)

(52) U.S. Cl.
CPC ......... *F16H 29/12* (2013.01); *G03G 15/2053* (2013.01); *G03G 21/1647* (2013.01)

(58) Field of Classification Search
CPC ....... G03G 21/1647; G03G 2221/1657; G03G 15/757; G03G 15/2032; G03G 15/2064; G03G 21/186; G03G 15/1615
See application file for complete search history.

(56) References Cited

U.S. PATENT DOCUMENTS 10,802,434 B2 * 10/2020 Nakamoto ......... G03G 15/2017
11,740,573 B2 * 8/2023 Takematsu ......... G03G 15/2017
399/328

FOREIGN PATENT DOCUMENTS

JP 4522241 B2 8/2010

* cited by examiner

*Primary Examiner* — Jessica L Eley
(74) *Attorney, Agent, or Firm* — Venable LLP

(57) ABSTRACT

A drive transmission device disclosed. The device has an input gear configured to rotate by a driving force from a driving source; a swing gear configured to rotate by a driving force from the input gear, the swing gear being located at a first position when the input gear is rotated in a forward direction and located at a second position that is different from the first position when the input gear is rotated in a backward direction that is a direction opposite to the forward direction; an output gear configured to separate from the swing gear when the swing gear is located at the first position, and that is in contact with the swing gear to be rotated by rotation of the swing gear when the swing gear is located at the second position; and a shaft portion configured to support the swing gear such that the swing gear is movable between the first position and the second position. The swing gear has a guide hole into which the shaft portion is inserted.

6 Claims, 21 Drawing Sheets

DRIVE TRANSMISSION DEVICE, FIXING DEVICE, AND IMAGE FORMING APPARATUS

BACKGROUND OF THE INVENTION

Field of the Invention

This invention relates to a drive transmission device, a fixing device equipped with this drive transmission device, and an image forming apparatus equipped with this fixing device.

Description of the Related Art

A conventional fixing device used in an image forming apparatus has a heating rotating member that heats an unfixed toner image born on a recording material, a heater that heats the heating rotating member, and a pressurizing rotating member that forms a nip portion with the heating rotating member. The fixing device fixes the toner image to the recording material by heating the recording material bearing the unfixed toner image while conveying the recording material at the nip portion.

A conventional fixing device is equipped with a pressure release mechanism that releases pressure on the nip portion to improve jam recovery capability when a jam occurs during the conveyance of a recording material and to prevent compressed deformation (plastic deformation) of the heating and pressurizing rotating members at the nip portion. In such a pressure release mechanism, a lever for manual pressure release or a motor for automatic pressure release is used. Recently, for a pressure release mechanism that automatically releases pressure by motor, it is desired to drive multiple rotating members by fewer motors from the viewpoint of user operability or cost reduction.

From the above viewpoints, a conventional configuration for pressure release in the pressure release mechanism is known in which the pressurizing rotating member and the pressure release cam are selectively rotated to rotate multiple rotating members with a single motor. A conventional pressure release mechanism is known in which a one-way unit is placed in the drive transmission path from the motor to the rotating members, and the motor is rotated forward or reverse to selectively drive the rotating members. In a typical one-way unit, multiple balls or needles are arranged in a circumferential direction, which increases the number of parts and complicates the structure, making smaller units more expensive.

To solve the above problem, Japanese Patent No. 4522241 discloses a drive transmission device that has a small number of parts including a simple swing gear. FIGS. 21A, 21B and 21C show the configuration of the swing gear 50 of Japanese Patent No. 4522241. FIG. 21A is a diagram showing a perspective view of the swing gear 50. FIG. 21B is a diagram showing an exploded perspective view of the swing gear 50 viewed from the side of the gear member 51. FIG. 21C is a diagram showing an exploded perspective view of the swing gear 50 viewed from the side of the holder member 52.

The swing gear 50 can be switched between being connected to and being disconnected from the output gear (not shown) by rocking by the switching of the direction of rotation of the input gear (not shown) connected to the swing gear 50.

In the swing gear 50, the rib 52a of the holder member 52 slides on the inner circumferential surface of the insertion hole 51a of the gear member 51, and the elastic member 53 slides on the inner circumferential surface of the insertion hole 51a, which generates driving noise and causes wear of each member. Therefore, in the swing gear 50, lubricant is applied to each part to quiet the driving noise and to reduce wear of each part. In the drive gear train located around the swing gear 50, lubricant is also applied to the gear tooth surfaces or the outer circumferential surface of the rotating shaft of the gear to quiet the driving noise and to reduce wear of each part.

However, in the apparatus of Japanese Patent No. 4522241, there is a problem that the gear member 51 cannot rock when lubricant is interposed between the inner circumferential surface of the elongated hole portion 52b of the holder member 52 and the shaft 57.

Specifically, when lubricant is interposed between the inner circumferential surface of the elongated hole portion 52b of the holder member 52 and the shaft 57, the inner circumferential surface of the elongated hole portion 52b is pressed against the shaft 57 by the rocking motion of the gear member 51, causing adsorption. The adsorption force in this case makes it impossible to switch the gear member 51 between being connected to and being disconnected from the output gear.

Further, it is possible to cover the inner circumferential surface of the elongated hole portion 52b and the outer circumferential surface of the shaft 57 with a cover to prevent lubricant from adhering to the inner circumferential surface of the elongated hole portion 52b and the outer circumferential surface of the shaft 57 during assembly. However, even in this case, since the inner circumferential surface of the elongated hole portion 52b and the outer circumferential surface of the shaft 57 cannot be completely covered by the cover, there is a concern that the lubricant may enter the interior through the gap between the cover and the inner circumferential surface of the elongated hole portion 52b or the outer circumferential surface of the shaft 57, causing accidental adhesion of the lubricant to the inner circumferential surface of the elongated hole 52b and the outer circumferential surface of the shaft 57.

SUMMARY OF THE INVENTION

A drive transmission device according to the present invention, comprising:
  an input gear configured to rotate by a driving force from a driving source;
  a swing gear configured to rotate by a driving force from the input gear, the swing gear being located at a first position when the input gear is rotated in a forward direction and located at a second position that is different from the first position when the input gear is rotated in a backward direction that is a direction opposite to the forward direction;
  an output gear configured to separate from the swing gear when the swing gear is located at the first position, and that is in contact with the swing gear to be rotated by rotation of the swing gear when the swing gear is located at the second position; and
  a shaft portion configured to support the swing gear such that the swing gear is movable between the first position and the second position,
  wherein the swing gear has a guide hole into which the shaft portion is inserted, and
  wherein an inner circumferential surface of the guide hole includes:

a first contact portion configured to contact with the shaft portion when the swing gear is located at the first position;

a first non-contact portion configured to provide alongside the first contact portion in a cross section in an axial direction of the shaft portion, the cross section passing through the first contact portion, the first non-contact portion being configured not to be in contact with the shaft portion when the swing gear is located at the first position;

a second contact portion configured to contact with the shaft portion when the swing gear is located at the second position; and a second non-contact portion configured to provide alongside the second contact portion in a cross section in the axial direction, the cross section passing through the second contact portion, the second non-contact portion being configured not to be in contact with the shaft portion when the swing gear is located at the second position.

Further features of the present invention will become apparent from the following description of exemplary embodiments with reference to the attached drawings.

DESCRIPTION OF THE EMBODIMENTS

Figure 1:
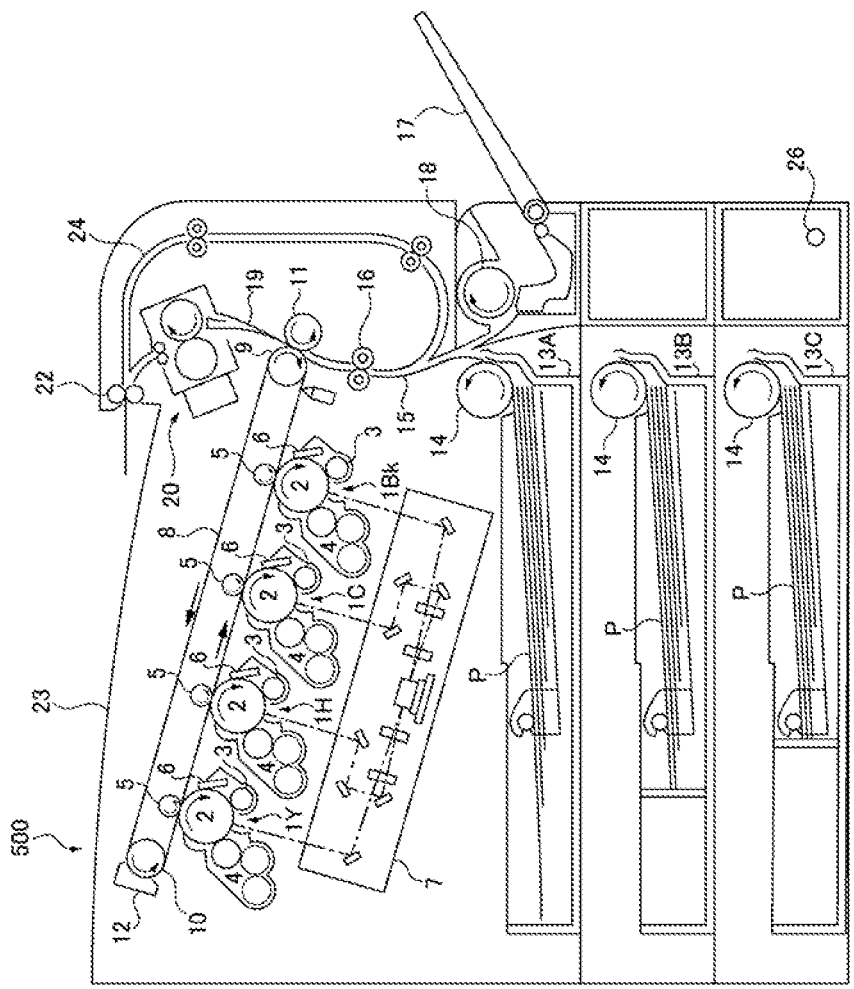
FIG. 1 is a schematic diagram of an image forming apparatus according to the first embodiment of the present invention with a cover closed.

Embodiments of the present invention will be described with reference to the drawings.

First Embodiment

<Configuration of Image Forming Apparatus>The configuration of the image forming apparatus 500 according to the first embodiment of the present invention will be described in detail with reference to FIGS. 1 and 2.

The image forming apparatus 500 has the cartridges 1Y, 1M, 1C and 1Bk, the primary transfer rollers 5, the scanner unit 7, the intermediate transfer belt 8, the secondary transfer counter roller 9, the tension roller 10, and the secondary transfer roller 11. The image forming apparatus 500 also has the transfer belt cleaning device 12, the sheet cassettes 13A, 13B and 13C, the sheet feeding roller 14, and the registration roller pair 16. Furthermore, the image forming apparatus 500 has the manual feeding tray 17, the sheet feeding roller 18, the fixing device 20, the discharge roller pair 22, the discharge tray 23, and the cover 25.

Figure 2:
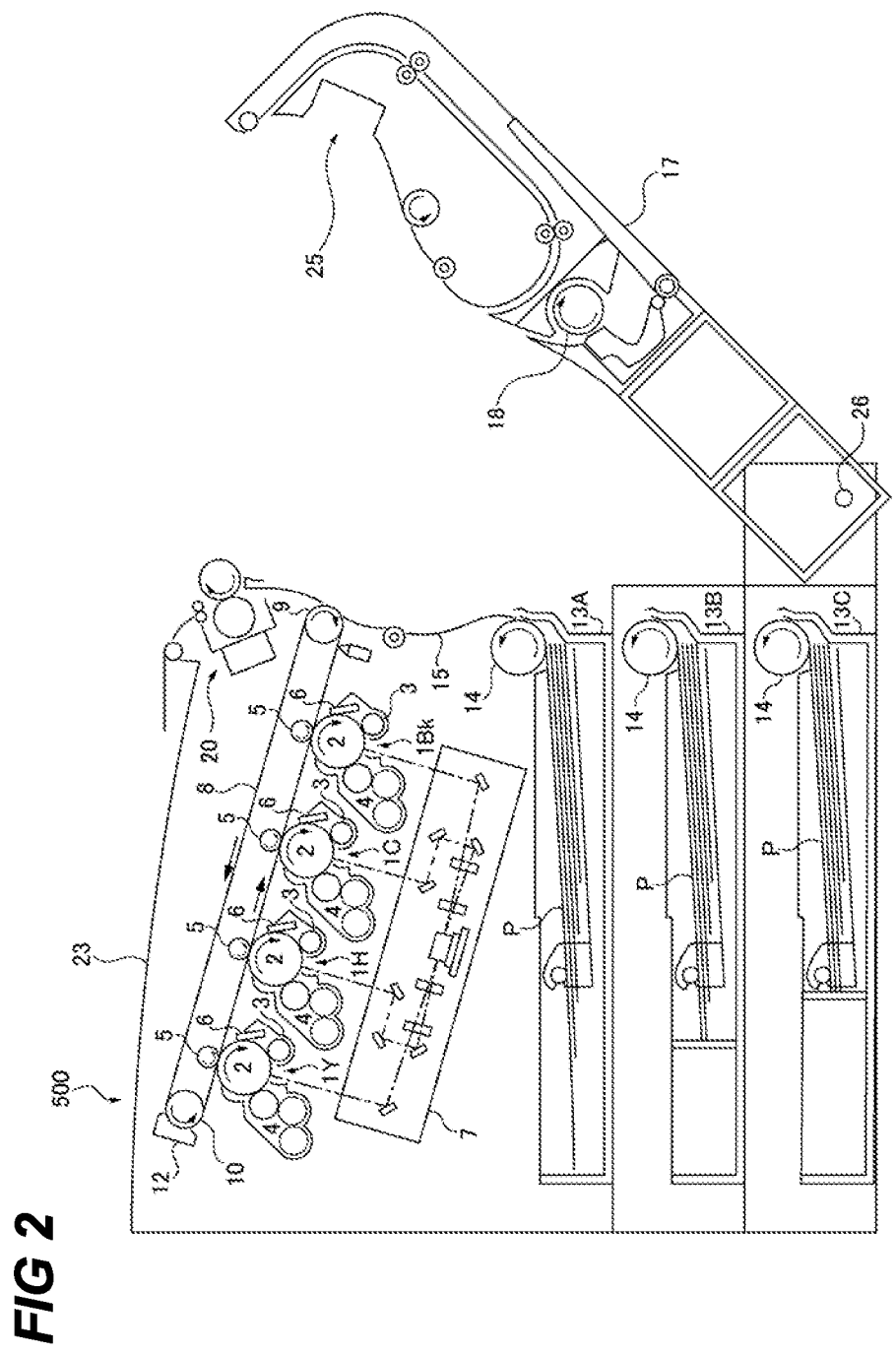
FIG. 2 is a schematic diagram of the image forming apparatus according to the first embodiment of the present invention with the cover opened.

The cartridges 1Y, 1M, 1C and 1Bk are arranged diagonally side by side in FIGS. 1 and 2. Each of the cartridges 1Y, 1M, 1C and 1Bk has the photosensitive drum 2, the charging roller 3, the developing unit 4 and the cleaning member 6.

The photosensitive drum 2 is driven to rotate clockwise in FIG. 1 by a drive member (not shown). Around the photosensitive drum 2, the charging roller 3 and the developing unit 4 are arranged in order of the direction of rotation of the photosensitive drum 2 from the cleaning member 6.

The charging roller 3 uniformly charges the surface of the photosensitive drum 2.

The developing unit 4 supplies toner agent to an electrostatic latent image formed on the photosensitive drum 2 to develop the electrostatic latent image as a toner image.

The cleaning member 6 removes residual toner agent remaining on the photosensitive drum 2 after the toner image formed on the photosensitive drum 2 is transferred onto the intermediate transfer belt 8.

Each primary transfer roller 5 is positioned inside the intermediate transfer belt 8 such that each primary transfer roller 5 is opposed to each photosensitive drum 2 via the intermediate transfer belt 8. A transfer bias is applied to the primary transfer roller 5 by a bias-applying means (not shown). For example, a transfer bias of positive polarity is applied to the primary transfer roller 5 from the bias-applying means when a negatively charged toner agent is used. The primary transfer roller 5 sequentially transfers the toner images formed on the photosensitive drum 2 onto the intermediate transfer belt 8 by applying the transfer bias.

The scanner unit 7 is located below the cartridges 1Y, 1M, 1C and 1Bk. The scanner unit 7 forms an electrostatic latent image on the surface of the photosensitive drum 2 by exposing, with a laser beam, the surface of the photosensitive drum 2, which has been charged by the charging roller 3.

The intermediate transfer belt 8 is tensioned by the secondary transfer counter roller 9 and the tension roller 10 and is driven to rotate counterclockwise in FIG. 1. The toner images of the four colors are primary transferred to the intermediate transfer belt 8 in an overlapping state by the primary transfer roller 5.

The secondary transfer counter roller 9 tensions the intermediate transfer belt 8 together with the tension roller 10.

The tension roller 10 tensions the intermediate transfer belt 8 together with the secondary transfer counter roller 9.

The secondary transfer roller 11 forms the secondary transfer portion by pressing the secondary transfer counter roller 9 via the intermediate transfer belt 8. In the secondary transfer portion, the secondary transfer roller 11 secondarily transfers the toner image that has been primarily transferred onto the intermediate transfer belt 8 onto the recording material P which has been conveyed from the registration roller pair 16. The secondary transfer roller 11 conveys to the fixing device 20 the recording material P, to which the toner image has been secondarily transferred.

The transfer belt cleaning device 12 removes the toner agent remaining on the intermediate transfer belt 8 after the secondary transfer to the recording material at the secondary transfer portion. Toner agent removed from the intermediate transfer belt 8 by the transfer belt cleaning device 12 passes through the waste toner transfer path (not shown) and is collected in the waste toner collection container (not shown).

The sheet cassettes 13A, 13B and 13C accommodate the recording materials P. The sheet cassettes 13A, 13B and 13C are detachably attached to the main body of the image forming apparatus 500. The sheet cassettes 13A, 13B and 13C are loaded with recording materials P of various sizes and widths after being removed from the main body of the apparatus. For replenishing the recording materials, the sheet cassettes 13A, 13B and 13C are attached to the main body of the apparatus after the recording materials P have been set in them.

The sheet feeding roller 14 provided for the sheet cassette selected from the sheet cassettes 13A, 13B and 13C presses the uppermost recording material P of the recording materials in the selected sheet cassette while being driven. As a result, the sheet feeding roller 14 separates the uppermost recording material P in the selected sheet cassette from the sheet cassettes 13A, 13B, and 13C, one sheet at a time, and feeds the uppermost recording material P to the registration roller pair 16 via the conveying path 15.

The registration roller pair 16 conveys the recording material P, which is conveyed from the sheet feeding roller 14 or the discharge roller pair 22, to the secondary transfer portion in synchronization with the image forming operation until the toner image is primarily transferred to the intermediate transfer belt 8.

The recording materials P are set on the manual feeding tray 17.

The sheet feeding roller 18 separates the recording materials P on the manual feeding tray 17 one by one, and feeds the separated recording material P to the registration roller pair 16 via the conveying path 15.

The fixing device 20 uses a film heating system. The fixing device 20 fixes the toner image on the recording material P by applying heat and pressure to the toner image that has been secondarily transferred to the recording material P conveyed from the secondary transfer portion. The fixing device 20 conveys to the discharge roller pair 22 the recording material P on which the toner image has been fixed. The configuration of the fixing device 20 will be described in detail later.

The discharge roller pair 22 discharges the recording material P conveyed from the fixing device 20 to the discharge tray 23 after single-sided printing or after the second side is printed in the mode of double-sided printing. The discharge roller pair 22 rotates in the reverse direction just before the rear end of the recording material P in the conveying direction passes through the discharge roller pair 22 during the double-sided printing so that the recording material P is conveyed to the double-sided printing conveying path 24.

The recording materials P discharged by the discharge roller pair 22 are stacked on the discharge tray 23.

The cover 25 can be opened and closed around the shaft 26.

In the image forming apparatus 500 having the above configuration, when forming an image on a recording material P, an electrostatic latent image formed on the surface of the photosensitive drum 2 by the scanner unit 7 is developed as a toner image by the cartridges 1Y, 1M, 1C and 1Bk and transferred to the intermediate transfer belt 8.

<Configuration of Fixing Device>

Figure 3:
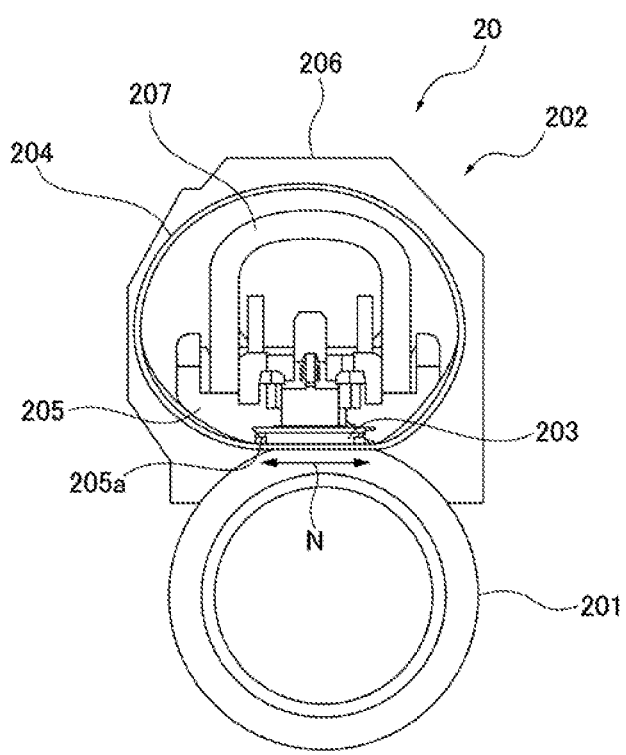
FIG. 3 is a schematic diagram of a fixing device of the image forming apparatus according to the first embodiment of the present invention.
Figure 4:
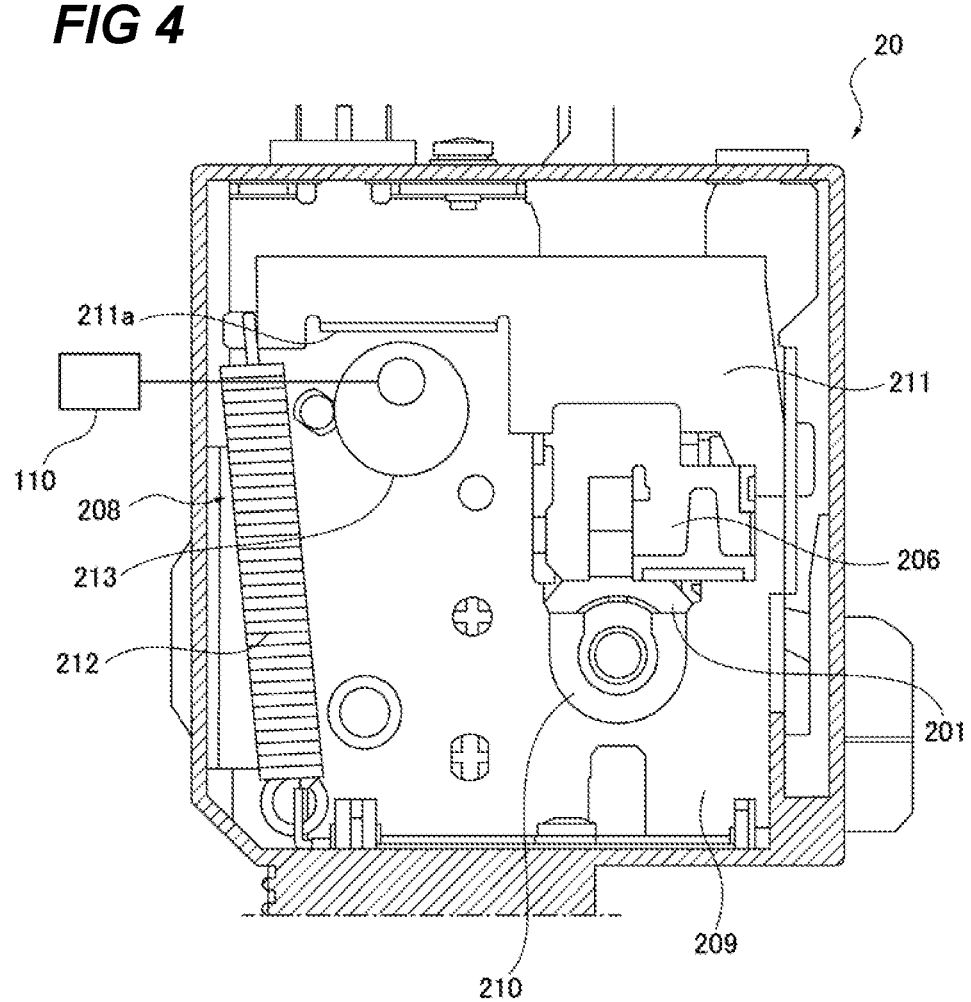
FIG. 4 is a diagram showing the inner configuration of the fixing device of the image forming apparatus according to the first embodiment of the present invention.
Figure 5:
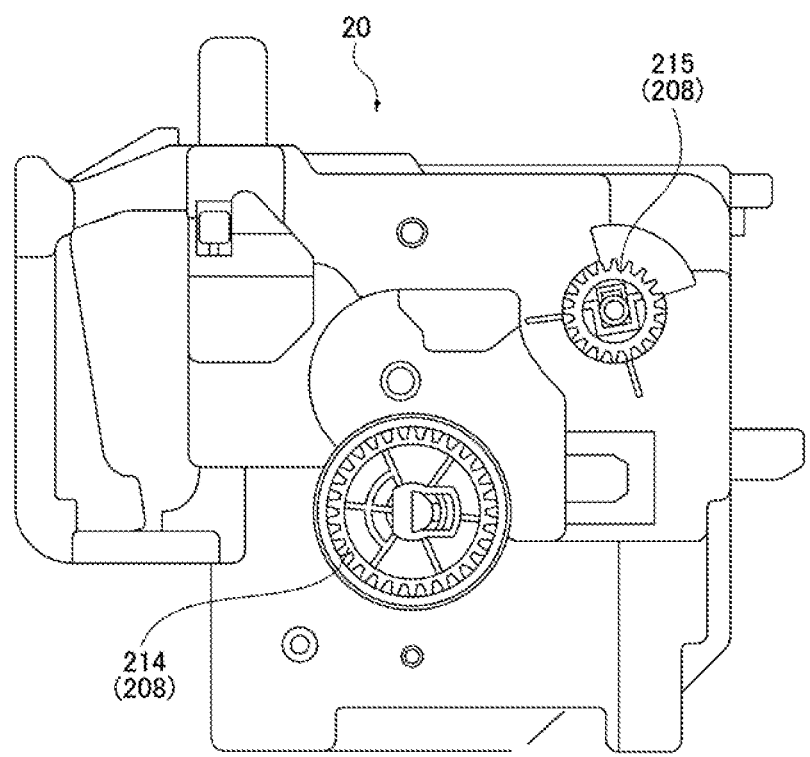
FIG. 5 is a diagram showing the outer configuration of the fixing device of the image forming apparatus according to the first embodiment of the present invention.

The configuration of the fixing device 20 of the image forming apparatus 500 according to the first embodiment of the present invention will be described in detail with reference to FIGS. 3 to 5.

The fixing device 20 includes the pressuring roller 201, the fixing film unit 202, the pressure release mechanism 208, the side plate 209 and the bearing member 210.

The pressuring roller 201 as a first rotating element pressurizes the fixing film unit 202 to form the nip N that heats the toner image by clamping and conveying the recording material. The pressuring roller 201 includes a metal core, a heat-resistant elastic material layer such as silicone rubber, fluoro rubber and fluoro resin molded coated concentrically and integrally around the periphery of the metal core, and a release layer as a surface layer provided around the outer periphery of the elastic material layer.

Here, the release layer is a fluoro resin material with a thickness of 100 μm or less, preferably 20 to 70 μm. Examples of the fluoro resin layers include PTFE and PFA.

The fixing film unit 202 has the ceramic heater 203, the fixing film 204, the heater holder 205, the fixing flange 206, and the pressure stay 207.

The ceramic heater 203 is a low heat capacity heater that has a long and thin ceramic substrate and an electric heating resistor layer on the substrate surface, and that raises the overall temperature with a steep rise characteristic by energizing the electric heating resistor layer. The ceramic heater 203 is fitted into the fitting groove 205a of the heater holder 205 and supported by the heater holder 205.

The fixing film 204 as a second rotating member is a heat-resistant cylindrical member that transfers heat to the recording material P and is fitted to the outside of the heater holder 205. The fixing film 204 is a four-layer composite film with a release layer, an elastic layer, a base layer and an inner coating layer. The release layer is a fluoro resin material with a thickness of 100 μm or less, preferably 20 to 70 μm. Examples of the fluoro resin layers include PTFE and PFA. The elastic layer is a rubber material 1000 μm thick or less, preferably 500 μm thick or less, to reduce thermal capacity. Examples of rubber materials include silicone rubber and fluoro rubber.

The base layer is of heat-resistant material 100 μm thick or less, preferably 50 μm or less and 20 μm or greater. Examples of the heat-resistant materials include metallic films such as SUS and nickel, and resin materials such as polyimide. The inner coating layer is a heat-resistant resin layer, such as polyimide, polyimide-amide, PEEK, PTFE, FEP and PFA.

The heater holder 205 is located inside the loop of the fixing film 204. The heater holder 205 is provided along the longitudinal direction (orthogonal to the paper surface in FIG. 3) on the underside surface with the fitting groove 205a for supporting the ceramic heater 203. The heater holder 205 forms the nip portion N by pressuring and contacting the pressuring roller 201 via the fixing film 204.

The heater holder 205 is formed by a material with good insulation, heat insulation, and heat resistance properties, such as phenolic resin, polyimide resin, polyamide resin, polyamideimide resin, PEEK resin, PES resin, PPS resin, PFA resin, PTFE resin and LCP resin.

The fixing flanges 206 are respectively fitted to both longitudinal ends of the pressure stay 207. The fixing flanges 206 guide the rotation of the fixing film 204 and restrict the longitudinal movement of the fixing film 204 so that they prevent the fixing film 204 from coming out. The fixing flanges 206 are held by the side plates 209 to which the fixing flanges 106 are fitted.

The pressure stay 207 is located inside the loop of the fixing film 204. The pressure stay 207 is pressed against the inner surface of the heater holder 205 and is a member to secure the strength of the heater holder 205 in the longitudinal direction as well as to straighten the heater holder 205.

The pressure release mechanism 208 switches between a pressurized state, in which the fixing film unit 202 applies pressure to the pressuring roller 201, and a release state, in which the pressure applied by the fixing film unit 202 is released by moving the fixing film unit 202. The configuration of the pressure release mechanism 208 will be described in detail below.

The side plates 209 respectively hold the bearing members 210 rotatably.

The bearing members 210 are respectively provided at both ends of the metal core of the pressuring roller 201 in the longitudinal direction and is made of a heat-resistant resin such as PEEK, PPS and LCP. The bearing members 210 support the pressuring roller 201 in a rotatable manner.

The fixing device 20 having the above configuration is driven by the drive transmission device 110 (omitted in FIGS. 1 and 2) described below, which is provided in the image forming apparatus 500.

<Configuration of Pressure Release Mechanism>

The configuration of the pressure release mechanism 208 of the image forming apparatus 500 according to the first embodiment of the present invention will be described in detail with reference to FIGS. 4 and 5.

The pressure release mechanism 208 includes the pressure member 211, the spring 212, the cam 213, the pressuring roller gear 214 and the cam gear 215.

The pressure member 211 includes the cam contact surface 211a that contacts the cam 213. The pressure member 211 is given a counterclockwise rotational force in FIG. 4 by the spring 212, with the right end side as the fulcrum in FIG. 4. The pressure member 211 presses the fixing flange 206 toward the pressuring roller 201 by the spring 212 when the pressure member 211 is not in contact with the cam 213 at the cam contact surface 211a, so that the pressuring roller 201 presses the fixing film 204 at the nip portion N. When the cam 213 rotates 180° from the state shown in FIG. 4, the cam contact surface 211a of the pressure member 211 contacts the cam 213 and is pushed up by the cam 213 to release the pressure between the fixing film 204 and the pressuring roller 201 at the nip portion N.

The spring 212 presses the pressure member 211 such that the fixing flange 206 is pressed by the pressure member 211 in the direction of the pressuring roller 201.

The cam 213 is driven by the rotation of the cam gear 215. When the cam 213 is driven to contact the cam contact surface 211a of the pressure member 211, the pressure between the fixing film 204 and the pressuring roller 201 is released. When the cam 213 is driven to be separated from the cam contact surface 211a, the pressuring roller 201 is pressed on the fixing film 204.

The pressuring roller gear 214 is connected to the drive transmission device 110 such that the driving force from the driving transmitting device 110 described below can be transmitted to the pressuring roller gear 214. The pressuring roller gear 214 transmits the driving force transmitted from the drive transmission device 110 to the pressuring roller 201 to rotate and drive the pressuring roller 201, so that the recording material is conveyed by the pressuring roller 201 at the nip portion N.

The cam gear 215 is connected to the drive transmission device 110 such that the driving force from the drive transmission device 110 can be transmitted to the cam gear 215. The cam gear 215 transmits the driving force transmitted from the drive transmission device 110 to the cam 213 to drive the cam 213.

<Configuration of Drive Transmission Device>

The configuration of the drive transmission device 110 according to the first embodiment of the present invention will be described in detail with reference to FIGS. 6A and 6B.

Figure 6A:
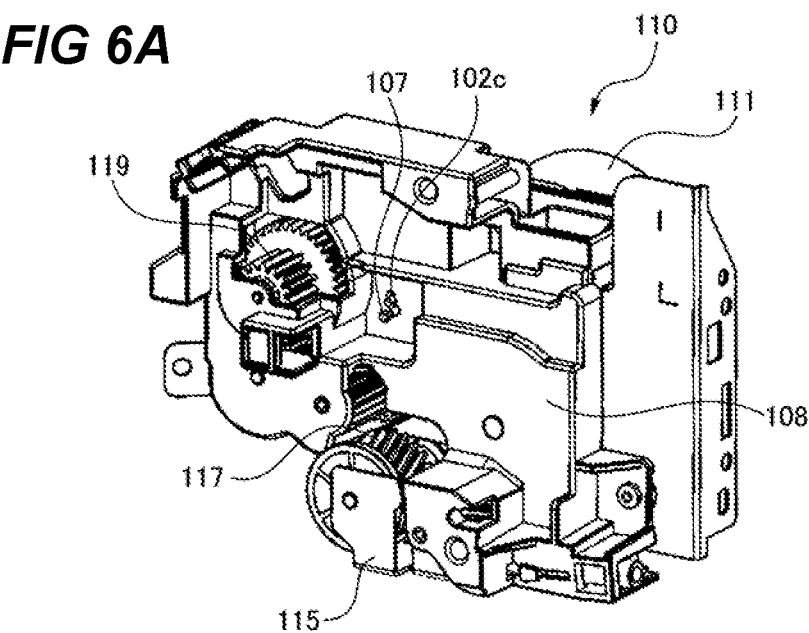
FIGS. 6A and 6B are diagrams showing perspective views of a drive transmission device according to the first embodiment of the present invention.

FIG. 6A is a diagram showing the perspective view of the drive transmission device 110. FIG. 6B is a diagram showing the perspective view of the drive transmission device 110 with the drive cover 108 removed. In FIG. 6B, the pressuring roller gear 214 and the cam gear 215 of the fixing device 20 are also shown.

The drive transmission device 110 is provided in the vicinity of the fixing device 20 attached to the image forming apparatus 500. The drive transmission device 110 is omitted in FIGS. 1 and 2. When the fixing device 20 is attached to or detached from the image forming apparatus 500, the drive transmission device 110 is connected to or is separated from each drive portion in the fixing device 20 accordingly.

Specifically, the drive transmission device 110 has the swing gear 100, the input gear 104, the output gear 105, the support frame 106, the shaft portion 107, the drive cover 108, the motor 111, the motor gear 112, the one-way clutch unit 113, the rocking unit 115, the rocking center gear 116, the swing gear 117, the idler gear 118 and the idler gear 119.

The swing gear 100 rocks according to the forward and reverse rotation of the input gear 104 to switch on and off the transmission of the driving force of the motor 111 to the cam gear 215. The configuration of the swing gear 100 will be described in detail below.

The input gear 104 transmits the driving force transmitted from the one-way clutch unit 113 to the swing gear 100.

The output gear 105 transmits the driving force transmitted from the swing gear 100 to the idler gear 118.

The motor 111 and the motor gear 112 are attached to the support frame 106 as a frame member.

The shaft 107 protrudes from the support frame 106 and supports the swing gear 100 in a rockable manner.

The drive cover 108 has the restricting groove 108a that penetrates the drive cover 108 in the direction of the plate thickness. The restricting groove 108a engages with the protruding portion 102c of the holder member 102 described below, thereby restricting the rocking range of the swing gear 100. The drive cover 108 rotatably supports one end of each gear of the drive transmission device 110 in the axial direction.

The motor 111 as a driving source is a DC brushless motor capable of rotating in the forward and reverse directions, and is positioned and fixed to the rear side of the support frame 106. The motor 111 is driven to rotate by power supplied from a power source (not shown). The motor 111 is not limited to a DC brushless motor, but can be any other motor other than a DC brushless motor, such as a stepping motor, as long as it can rotate in forward and reverse directions.

The motor gear 112 transmits the driving force of the motor 111 to the one-way clutch unit 113.

The one-way clutch unit 113 transmits the driving force transmitted from the motor gear 112 to the input gear 104 and the rocking center gear 116, or blocks the transmission of the driving force transmitted from the motor gear 112 to the rocking center gear 116. According to the forward and reverse rotations of the motor 111, the one-way clutch unit 113 rotates the forward and reverse directions to switch between the transmission of the driving force of the motor 111 to the pressuring roller gear 214 and the blockage of the transmission to the pressuring roller gear 214. The configuration of the one-way clutch unit 113 will be described in detail below.

The rocking unit 115 includes the rocking center gear 116 and the swing gear 117.

The rocking center gear 116 transmits the driving force transmitted from the one-way clutch unit 113 to the swing gear 117.

The swing gear 117 transmits the driving force transmitted from the rocking center gear 116 to the pressuring roller gear 214.

The idler gear 118 transmits the driving force transmitted from the output gear 105 to the idler gear 119.

The idler gear 119 transmits the driving force transmitted from the idler gear 118 to the cam gear 215.

In the drive transmission device 110 having the above configuration, all drive gears on the drive transmission path from the motor gear 112 to the pressuring roller gear 214 are helical gears.

<Configuration of One-Way Clutch Unit>

The configuration of the one-way clutch unit 113 of the drive transmission device 110 will be described in detail with reference to FIGS. 7A, 7B, 8A and 8B.

Figure 7A:
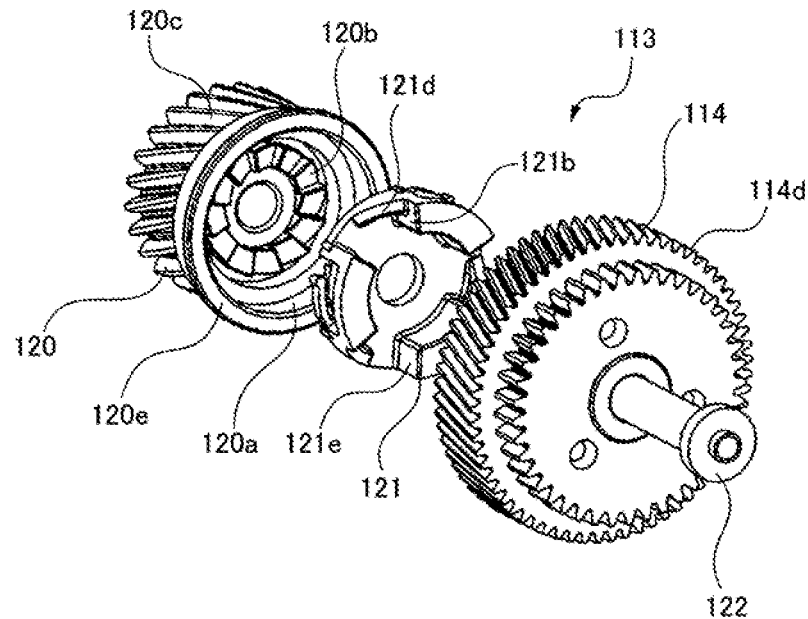
FIGS. 7A and 7B are diagrams showing exploded perspective views of a one-way clutch unit of the drive transmission device according to the first embodiment of the present invention.
Figure 7B:
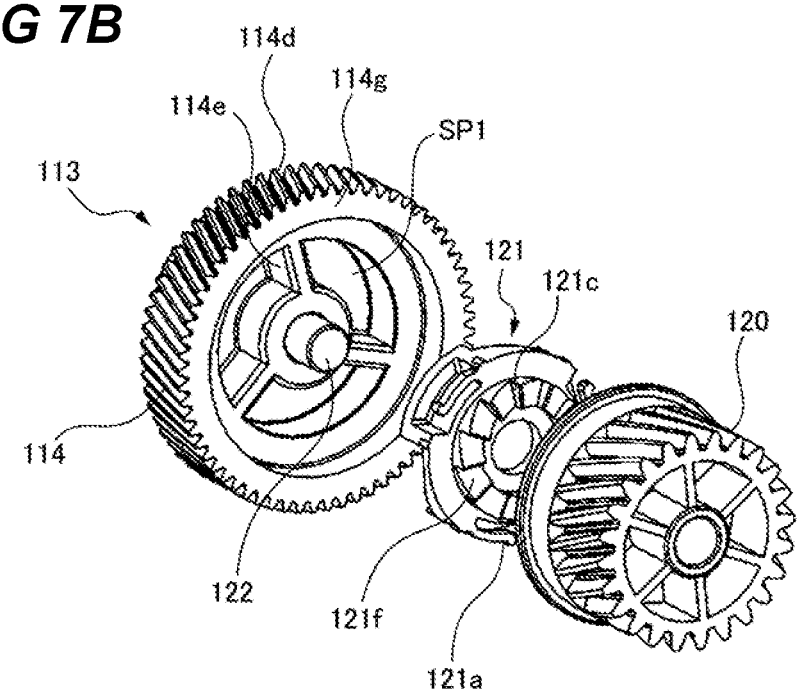

FIG. 7A is a diagram showing an exploded perspective view of the one-way clutch unit 113 viewed from the side of the input gear 114. FIG. 7B is a diagram showing an exploded perspective view of the one-way clutch unit 113 viewed from the side of the output gear 120.

Figure 8A:
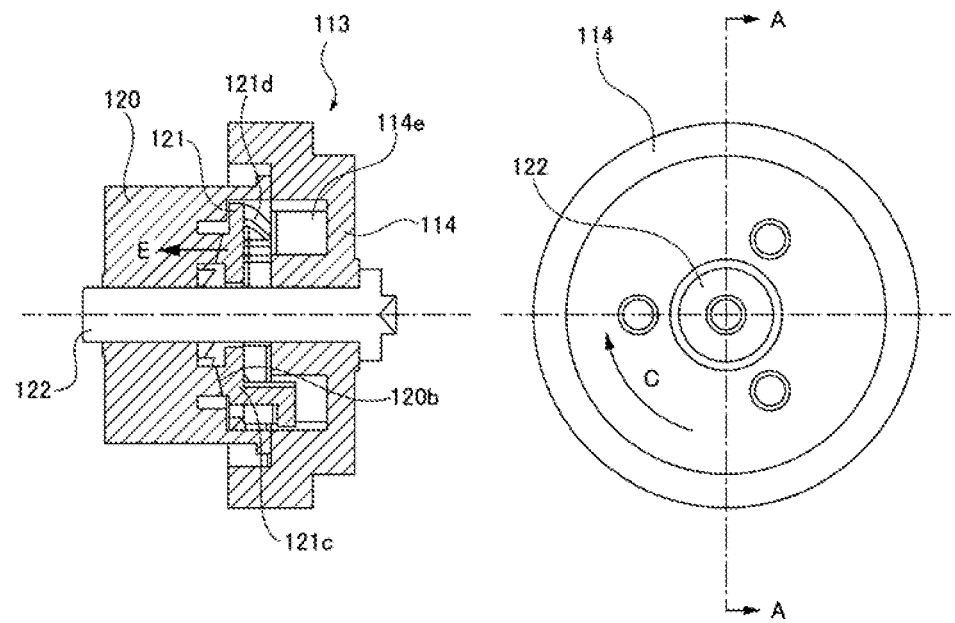
FIGS. 8A and 8B are diagrams, each showing an operation of a one-way clutch unit of the drive transmission device according to the first embodiment of the present invention.
Figure 8B:
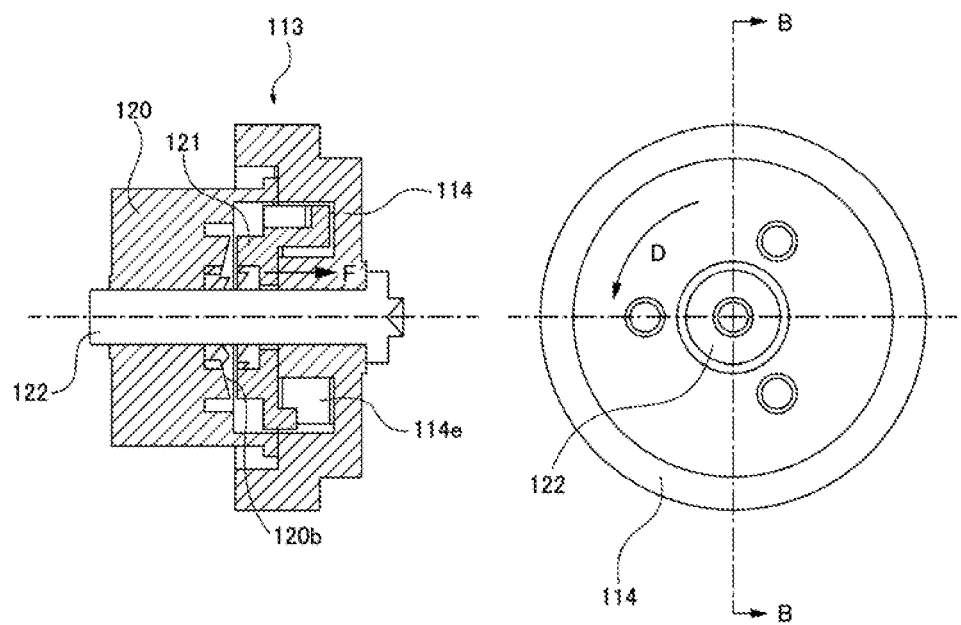

FIG. 8A is a diagram showing the one-way clutch unit 113 and A-A cross-section viewed from the side of the input gear 114 when the drive coupling is completed. FIG. 8B is a diagram showing the one-way clutch unit 113 and B-B cross-section viewed from the side of the input gear 114 when the release of the drive coupling is completed.

The one-way clutch unit 113 includes the input gear 114, the output gear 120, the drive transmission cam 121, and the shaft 122.

The input gear 114 includes the tooth surface 114d on its outer circumferential surface and the annular rib 114g. The inside of the annular rib 114g is concave. Three engaging ribs 114e are provided in the space SP1 surrounded by the annular ribs 114g of the input gear 114. The engaging ribs 114e engage with the input side forward rotation engaging portion 121b of the drive transmission cam 121.

The output gear 120 includes the tooth surface 120c on the outer circumferential surface of the output gear 120. The inner side of the annular rib 120e of the output gear 120 is concave. The output gear 120 includes the contact surface 120a on the inner circumferential surface of the annular rib 120e that is in contact with the urging portions 121a of the drive transmission cam 121. The output gear 120 includes the cam surface 120b that engages with the output side forward rotation engaging portion 121c of the drive transmission cam 121.

The drive transmission cam 121 includes the urging portions 121a, the input side forward rotation engaging portions 121b, the output side forward rotation engaging portions 121c, the input side inclined surfaces 121d, and the input side reverse rotation engaging portions 121e, and the output side inclined surfaces 121f.

The urging portions 121a are provided at the constant intervals on the outer circumferential surface of the drive transmission cam 121 and come into contact with the contact surface 120a of the output gear 120. The urging portions 121a enable the urging direction of the drive transmission cam 121 to be switched by the urging force of the urging portions 121a in accordance with the switching of the rotation direction of the input gear 114.

The input side forward rotation engaging portions 121b are provided on the surface of the drive transmission cam 121 facing the input gear 114, and engage the three engaging ribs 114e of the input gear 114 during forward rotation in the direction of the arrow C in FIG. 8A.

The output side forward rotation engaging portions 121c are provided on the surface of the drive transmission cam 121 facing the output gear 120 and engage the three engaging ribs 114e of the input gear 114 during forward rotation.

The input side inclined surfaces 121d are provided on the surface of the drive transmission cam 121 facing the input gear 114, and are gently inclined from the input side forward rotation engaging portions 121b to the input side reverse rotation engaging portions 121e.

The input side reverse engaging portions 121e are provided on the surface of the drive transmission cam 121 facing the input gear 114 and engage the three engaging ribs 114e of the input gear 114 during reverse rotation in the direction of the arrow D in FIG. 8B.

The output side inclined surfaces 121f are provided on the surface of the drive transmission cam 121 facing the output gear 120 and move the drive transmission cam 121 toward the input gear 114 during the reverse rotation.

The shaft 122 is supported by the support frame 106 and is inserted to the input gear 114 and the output gear 120 to rotatably support the input gear 114 and the output gear 120. The shaft 122 is inserted to the drive transmission cam 121 with clearance.

<Configuration of Swing Gear>

The configuration of the swing gear 100 of the drive transmission device 110 according to the first embodiment of the present invention will be described in detail with reference to FIGS. 9A, 9B, 9C, 10, 13A, 13B, 14A and 14B.

Figure 9A:
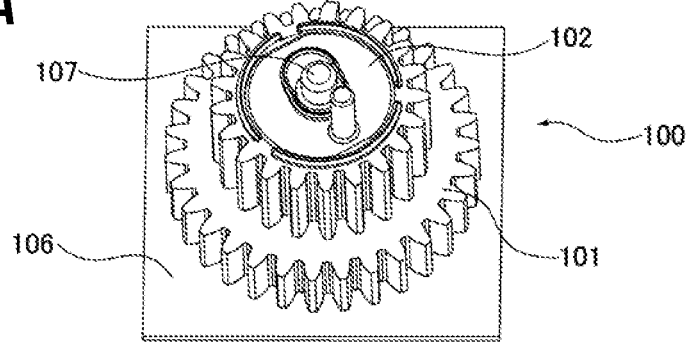
FIGS. 9A, 9B and 9C are diagrams, each showing a perspective view of a swing gear of the drive transmission device according to the first embodiment of the present invention.
Figure 9B:
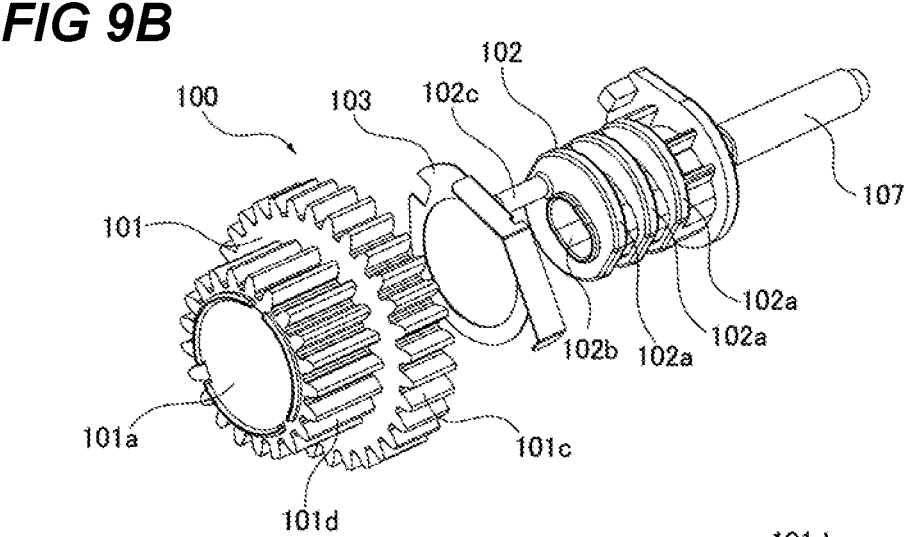
Figure 9C:
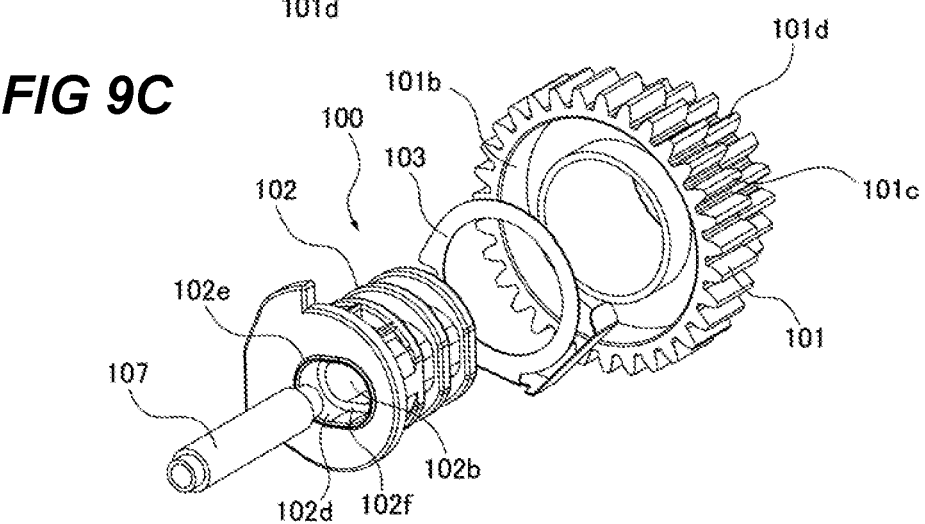

FIG. 9A is a diagram showing a perspective view of the swing gear 100. FIG. 9B is a diagram showing an exploded perspective view of the swing gear 100 viewed from the side of the gear member 101. FIG. 9C is a diagram showing an exploded perspective view of the swing gear 100 viewed from the side of the holder member 102.

Figure 13A:
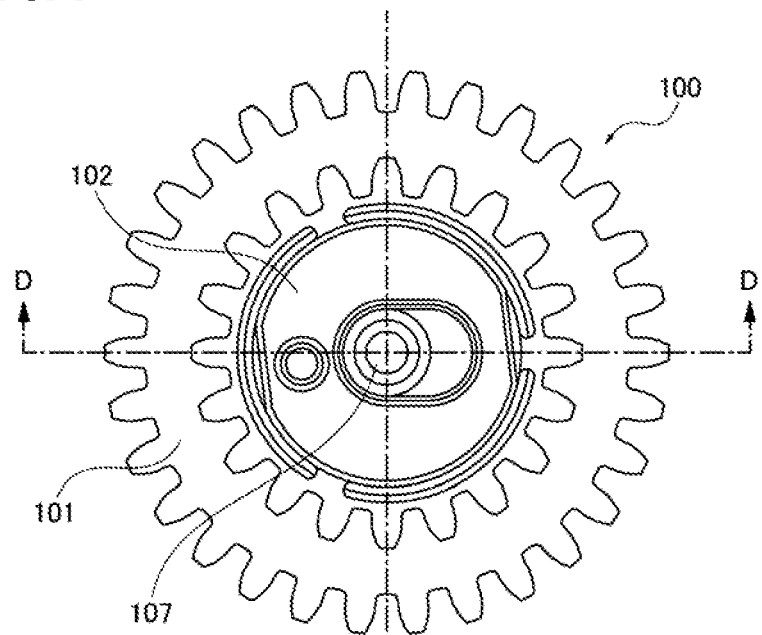
FIGS. 13A and 13B are diagrams, each showing the inner configuration of the swing gear of the drive transmission device according to the first embodiment of the present invention.
Figure 13B:
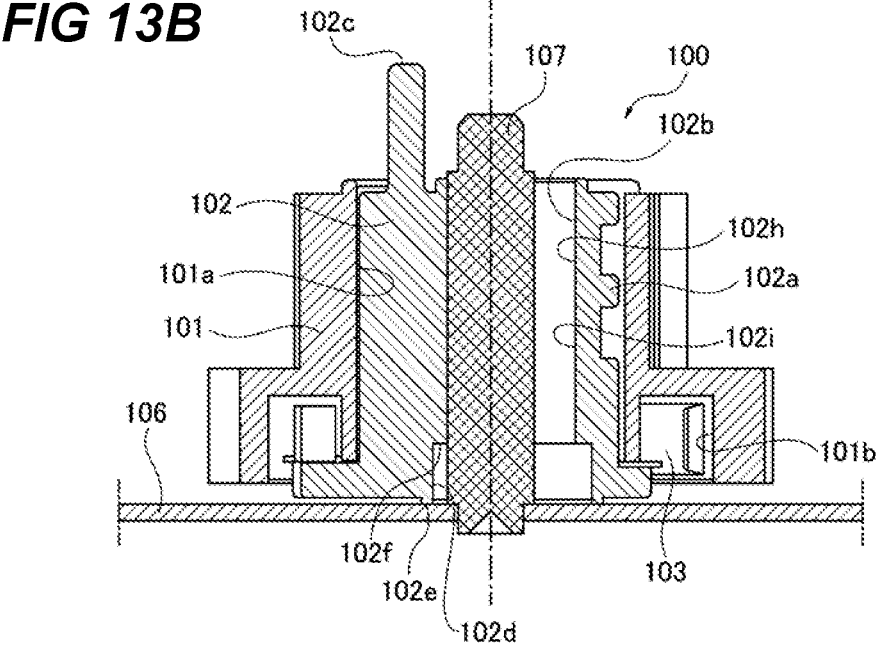

FIG. 13A is a diagram showing the configuration of the swing gear 100 viewed from the side of the gear 101d, and FIG. 13B is a D-D cross section of FIG. 13A.

Figure 14A:
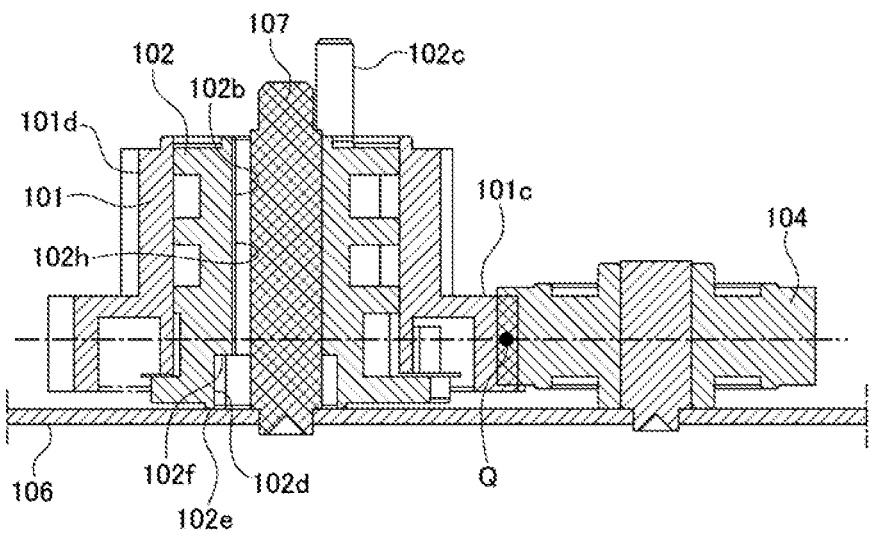
FIGS. 14A and 14B are diagrams showing cross-sectional views of the step portions of the configurations, which are different from each other, of the swing gear of the drive transmission device according to the first embodiment of the present invention.
Figure 14B:
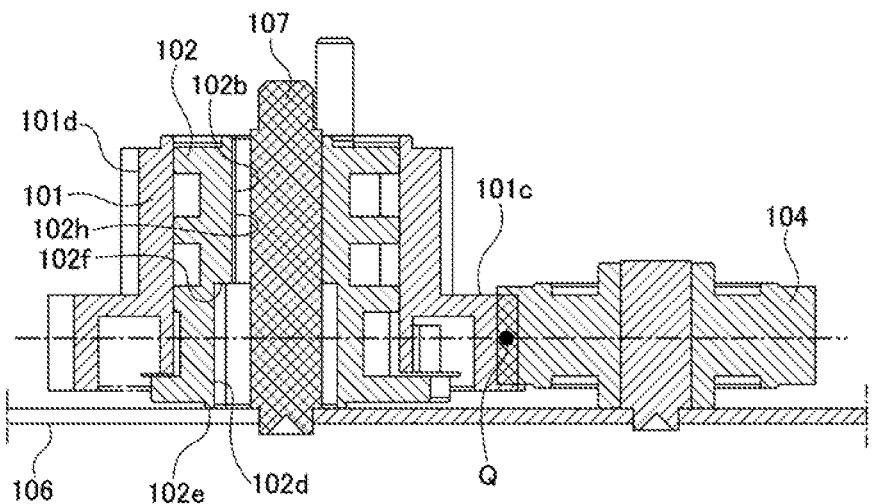

FIG. 14A is a diagram showing the configuration of the swing gear 100 with the switching surface 102f closer to the support frame 106 than the center position Q. FIG. 14B is a diagram showing the configuration of the swing gear 100 with the center position Q closer to the support frame 106 than the switching surface 102f.

The swing gear 100 includes the gear member 101, the holder member 102 and the elastic member 103.

The gear member 101 is cylindrically formed. The gear member 101 includes the gear 101c connected to the input gear 104, and the gear 101d that contacts and is separated from the output gear 105 as the swing gear 100 rocks.

The holder member 102 includes the circular rib 102a, the elongated hole portion 102b, the protruding portion 102c, and the step portion 102d, and is held at the support frame 106 in a rockable manner.

The rib 102a is inserted into the insertion hole of the gear member 101 and fitted the inner surface 101a of the insertion hole to rotatably support the gear member 101.

The elongated hole portion 102b as a guide hole penetrates the holder member 102 in the axial direction of the shaft portion 107 (vertical direction in FIG. 13B). Further, the elongated hole portion 102b is elongated in the direction perpendicular to the axial direction of the shaft portion 107. The shaft portion 107 protruding from the support frame 106 is inserted into the elongated hole portion 102b.

The protruding portion 102c is inserted into the restricting groove 108a formed in the drive cover 108 and is movably engaged with the restricting groove 108a.

The step portion 102d is provided at the end of the elongated hole portion 102b on the side of the support frame 106 in the axial direction of the shaft portion 107. The step portion 102d has the inner diameter larger than the inner diameter of the contact portion 102i, which is the portion other than the step portion 102d in the elongated hole portion 102b, and does not contact the shaft 107 by having a gap between the step portion 102d and the shaft 107. The step portion 102d has a switching surface 102f at the end of the step portion 102d opposite to the side of the support frame 106 in the axial direction of the shaft portion 107. It is desirable that the switching surface 102f is formed such that the switching surface 102f is arranged closer to the support frame 106 than the center position Q (see FIG. 14B) of the width of engagement between the gear member 101 and the input gear 104 which width is parallel to the axial direction of the shaft portion 107.

Figure 10:
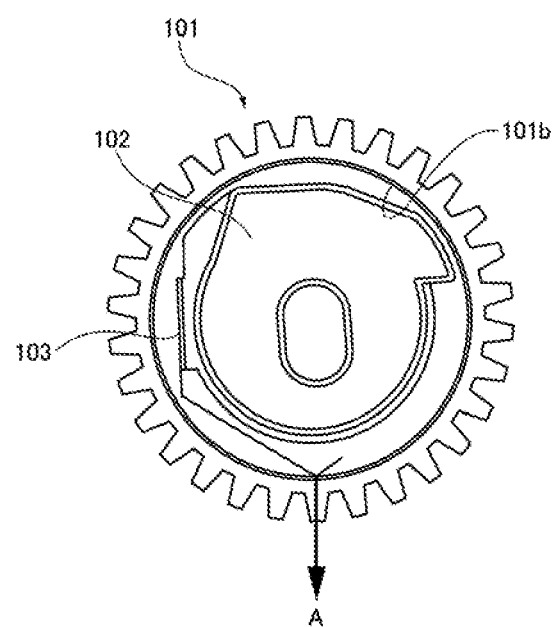
FIG. 10 is a diagram showing the positional relationship between a gear member, a holder member and an elastic member of the drive transmission device according to the first embodiment of the present invention.

The elastic member 103 is fixed to the holder member 102 and also presses the inner circumferential surface 101b of the large diameter portion of the gear member 101 in the direction of arrow A in FIG. 10 by its own elastic force. The elastic member 103 provides a rotational load to the gear member 101.

In the swing gear 100 having the above configuration, lubricant is applied to the sliding surfaces of the inner circumferential surface 101a and the rib 102a and to the sliding surfaces of the inner circumferential surface 101b and the elastic member 103 for quietness and wear reduction. Lubricant is also applied in the same manner to the tooth surfaces of gears in the drive transmission device 110 and the outer circumferential surfaces of the rotating shafts of the gears. The lubricant is, for example, viscous grease or volatile grease.

<Operation of the Drive Transmission Device>

The operation of the drive transmission device 110 of the first embodiment of the present invention will be described in detail with reference to FIGS. 8A through 13B.

Figure 11A:
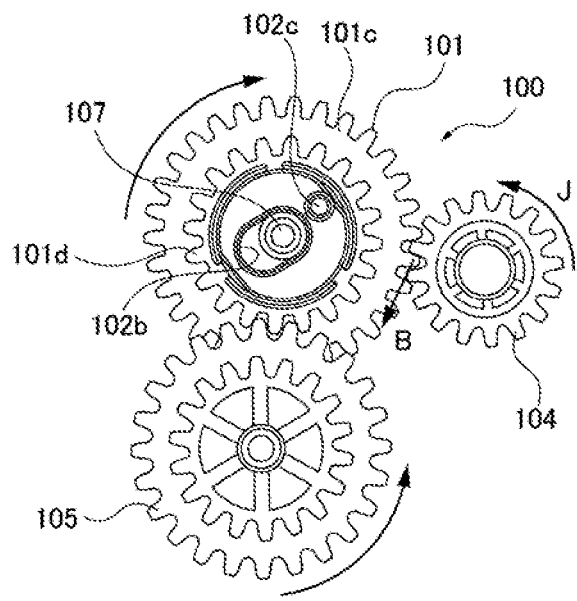
FIGS. 11A, 11B, 11C and 11D are diagrams, each showing an operation of the swing gear of the drive transmission device according to the first embodiment of the present invention.
Figure 11B:
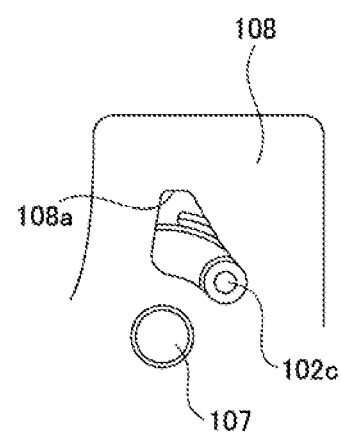
Figure 11C:
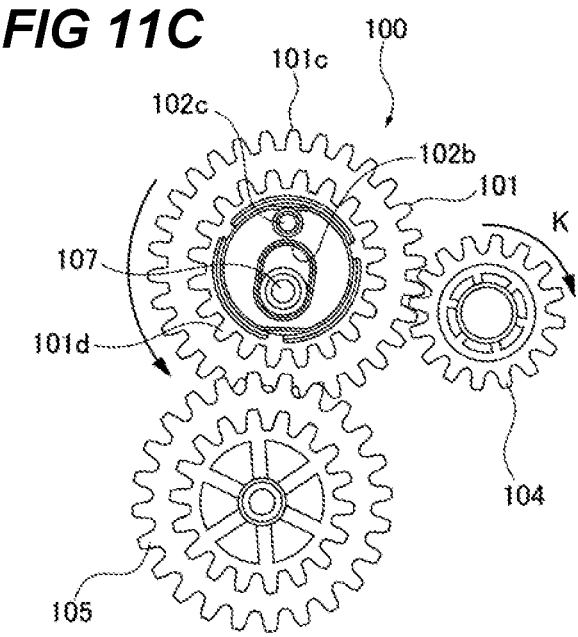
Figure 11D:
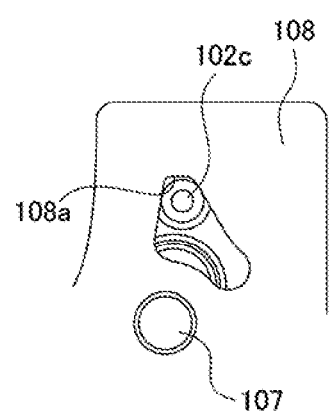

FIG. 11A is a diagram showing the state in which the swing gear 100 is connected to the output gear 105. FIG. 11B is a diagram showing the relationship between the restricting groove 108a and the protruding portion 102c in the state of FIG. 11A. FIG. 11C is a diagram showing the state in which the swing gear 100 is separated from the output gear 105. FIG. 11D shows the relationship between the restricting groove 108a and the protruding portion 102c in the state of FIG. 11C.

Figure 12A:
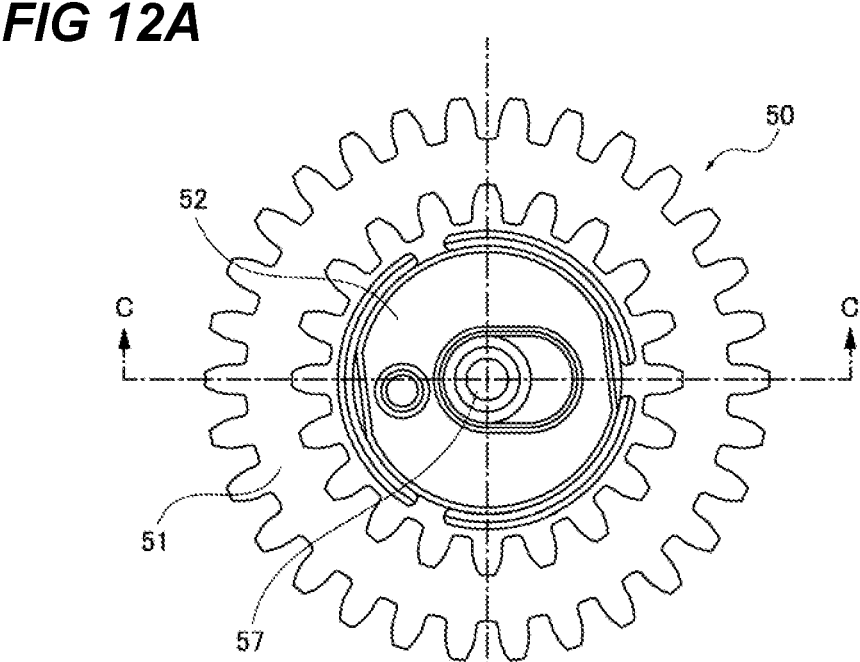
FIGS. 12A and 12B are diagrams, each showing the configuration of the swing gear of a conventional drive transmission device for comparing with the swing gear of the drive transmission device according to the first embodiment of the present invention.
Figure 12B:
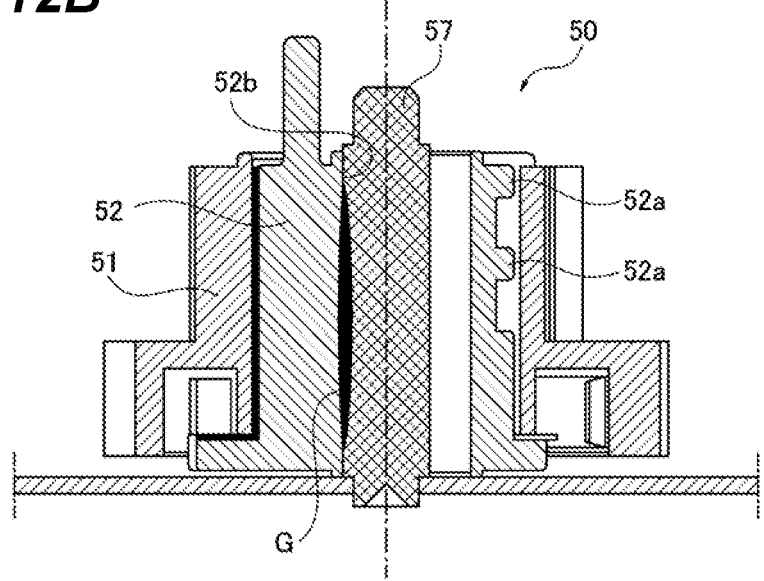

FIG. 12A is a diagram showing a conventional swing gear 50 shown as a comparison with the present embodiment. FIG. 12B is a C-C cross section of FIG. 12A.

First, the operation of the one-way clutch unit 113 will be described.

In the one-way clutch unit 113, the input side inclined surfaces 121d are pressed in the direction E in FIG. 8A by the engaging rib 114e when the input gear 114 is rotated in the direction C in FIG. 8A in the decoupled state between the input gear 114 and the output gear 120. As a result, the drive transmission cam 121 is urged in the direction of the arrow E toward the output gear 120.

The drive coupling between the input gear 114 and the output gear 120 is completed when the engaging ribs 114e engage with the input side forward rotation engaging portions 121b and the cam surfaces 120b of the output gear 120 engage with the output side forward rotation engaging portions 121c on the drive transmission cam 121. As a result, the one-way clutch unit 113 transmits the driving force of the motor 111 transmitted from the motor gear 112 to the pressuring roller gear 214 via the rocking center gear 116 and the swing gear 117.

In the one-way clutch unit 113, the input side reverse rotation engaging portions 121e are pressed by the engaging rib 114e when the input gear 114 is rotated in the direction D in FIG. 8B in the coupled state between the input gear 114 and the output gear 120. The drive transmission cam 121 then rotates in the direction D. The drive transmission cam 121, which rotates in the direction D, moves in the direction F when the output side inclined surfaces 121f are pressed in the direction F in FIG. 8B by the inclined cam surface 120b, which completes the drive decoupling between the input gear 114 and output gear 120. The one-way clutch unit 113 thereby blocks the transmission of the driving force of the motor 111 to the pressuring roller gear 214.

In the above operation, all the gears on the drive transmission path from the motor gear 112 which rotates at a high speed over a long period of time when conveying a recording material to the pressuring roller gear 214, are configured with helical gears, thereby reducing the generated operating noise.

Next, the operation of the swing gear 100 will be described.

The swing gear 100 couples or decouples the gear member 101 to/from the output gear 105 by switching the direction of the rotation of the input gear 104 according to the direction of the rotation of the forward and the reverse of the motor 111. The swing gear 100 is held in a rockable manner to the support frame 106 by the shaft portion 107 protruding from the support frame 106 being inserted into the elongated hole portion 102b of the holder member 102. The shaft portion 107 supports the swing gear 100 in a position where the swing gear 100 is connected to the output gear 105 and in a position where the swing gear 100 is separated from the output gear 105. In this case, the elastic member 103 fixed to the holder member 102 urges the inner circumferential surface 101b of the gear member 101 in the direction A in FIG. 10. This gives a rotational load to the gear member 101, thereby generating a rocking force in the holder member 102, and the gear member 101 is rocked.

Specifically, when the input gear 104 rotates in the direction J (reverse direction) in FIG. 11A, a rotational driving force is transmitted from the input gear 104 to the gear member 101 that meshes with the input gear 104. When the gear member 101 receives a rotational driving force from the input gear 104, the tangential force in direction B in FIG. 11A that the gear member 101 receives from the input gear 104 increases. The rocking force is generated in the gear member 101 by the increased tangential force in the direction B, the rotational load from the elastic member 103, and the driving force received from the input gear 104.

As a result, the swing gear 100 moves from a position where it is separated from the output gear 105 (first position) to a position where it is connected to the output gear 105 (second position) by rocking. At this time, the protruding portion 102c moves the restricting groove 108a from the position shown in FIG. 11D to the position shown in FIG. 11B, and the gear member 101 moves from the position shown in FIG. 11C to the position shown in FIG. 11A where the gear member 101 engages with the output gear 105. The swing gear 100 transmits the driving force of the motor 111 transmitted from the input gear 104 to the cam gear 215 via the output gear 105, the idler gear 118 and the idler gear 119.

When the input gear 104 rotates in the direction K (forward direction) in FIG. 11C, a rotational driving force is transmitted from the input gear 104 to the gear member 101 of the swing gear 100 that meshes with the input gear 104. When the gear member 101 receives the rotational driving force from the input gear 104, the tangential force that the gear member 101 receives from the input gear 104 in the direction symmetrical with the direction B in FIG. 11A with respect to the hypothetical line connecting the axis of rotation of the input gear 104 and the shaft portion 107 increases. The rocking force is generated in the gear member 101 by the increase in the tangential force in the direction symmetrical with the direction B and the driving force received from the input gear 104.

As a result, the swing gear 100 moves from a position where it is connected to the output gear 105 (second position) to a position where it is separated from the output gear 105 (first position) by rocking. In this case, the protruding portion 102c moves the restricting groove 108a from the position shown in FIG. 11B to the position shown in FIG. 11D, and the gear member 101 moves from the position shown in FIG. 11A to the position shown in FIG. 11C where it is retracted from the output gear 105. The swing gear 100 then blocks the transmission of the driving force received from the input gear 104 to the output gear 105.

The inner circumferential surface 102h of the elongated hole portion 102b includes a first contact portion, which is the contact portion 102i, and a first non-contact portion, which is the step portion 102d provided alongside the first contact portion. In the above operation, when the swing gear 100 is positioned in a position where the swing gear 100 is separated from the output gear 105, the first contact portion contacts the shaft portion 107 and the first non-contact portion does not contact the shaft portion 107. The inner circumferential surface 102h of the elongated hole portion 102b includes a second contact portion, which is the contact portion 102i, and a second non-contact portion, which is the step portion 102d provided alongside the second contact portion. In the above operation, when the swing gear 100 is positioned in a position where the swing gear 100 is connected to the output gear 105, the second contact portion contacts the shaft portion 107 and the second non-contact portion does not contact the shaft portion 107. The first non-contact portion and the second non-contact portion are separate portions of one continuous groove formed in the inner circumferential surface 102h of the elongated hole portion 102b. The first non-contact portion and the second non-contact portion may be grooves separated from each other that are not continuous with each other and formed on the inner circumferential surface of the elongated hole portion 102b.

When the drive transmission device 110 is assembled, the lubricant G applied inside the swing gear 100 or the drive transmission device 110 may accidentally adhere to the support frame 106. When the drive transmission device 110 is operated, the lubricant G may scatter and adhere to the support frame 106.

In this case, as shown in FIG. 12, when the step portion 102d is not provided, the contact surface 102e of the holder member 102, which contacts the support frame 106 is connected to the inner circumferential surface 102h of the elongated hole portion 102b that contacts the shaft portion 107. Therefore, in this case, the lubricant G adhering to the support frame 106 enters the elongated hole portion 102b via the contact surface 102e due to the rocking motion of the swing gear 100. As a result, the swing gear 100 is unable to rock due to the lubricant G interposed between the elongated hole portion 102b and the shaft portion 107, and the gear member 101 cannot switch between the connection and the separation from the gear member 101 to the output gear 105.

In contrast, when the step portion 102d is provided, the contact surface 102e is separated from the inner circumferential surface 102h of the elongated hole portion 102b that the shaft portion 107 contacts, thereby preventing the lubricant G from sticking to the inner circumferential surface 102h of the elongated hole portion 102b that the shaft portion 107 contacts.

When the center position Q of the engaging width between the gear member 101 and the input gear 104 is closer to the support frame 106 than the switching surface 102f of the step portion 102d, the step portion 102d and the center position Q which is the point of effort overlap, as shown by the single-dotted line in FIG. 14B. In this case, the holder member 102 may tilt due to the shaft portion 107 entering the step portion 102d of the elongated hole portion 102b.

In contrast, when the switching surface 102f is closer to the support frame 106 than the center position Q, the step portion 102d and the center position Q which is the point of effort, do not overlap with each other, as shown by the single-dotted line in FIG. 14A. This prevents the holder member 102 from tilting due to the shaft portion 107 entering the step portion 102d of the elongated hole portion 102b.

Thus, the drive transmission device 110 switches between the driving of the pressuring roller 201 and the driving of the pressure release mechanism 208 according to the direction of the rotation of the forward and the reverse of the motor 111 by means of the swing gear 100 and the one-way clutch unit 113.

In the present embodiment, the shaft portion 107 and the inner circumferential surface 102h of the elongated hole portion 102b do not come into contact with each other at the end of the shaft portion 107 on the side of the support frame 106 in the axial direction of the shaft portion 107. As a result, the drive operation becomes quieter, abrasion may be reduced, and the switching operation in selectively switching the drives may be stabilized.

In the present embodiment, the gear 101c, which meshes with the input gear 104 of the gear member 101, is closer to the support frame 106 than the gear 101d, which meshes with the output gear 105 of the gear member 101. However, the present invention is not limited to this configuration, and the gear 101d, which meshes with the output gear 105 of the gear member 101, may be closer to the support frame 106 than the gear 101c, which meshes with the input gear 104 of the gear member 101. In this case, the switching surface 102f can be provided in a more upward position in FIG. 13B.

Second Embodiment

The configuration of the image forming apparatus for the second embodiment of the present invention is the same as that shown in FIGS. 1 and 2, so the description thereof will be omitted. The configuration of the fixing device for the present embodiment is the same as that shown in FIGS. 3 to 5, so the description thereof will be omitted. The configuration of the pressure release mechanism for the present embodiment is the same as that shown in FIGS. 4 and 5, so the description of thereof will be omitted. The configuration of the one-way clutch unit for the present embodiment is the same as that shown in FIGS. 7A, 7B, 8A and 8B, so the description of thereof will be omitted.
<Configuration of Drive Transmission Device>

The configuration of the drive transmission device 1110 of the second embodiment of the present invention will be described in detail with reference to FIGS. 15A, 15B, 15C, 16A and 16B.

Figure 6B:
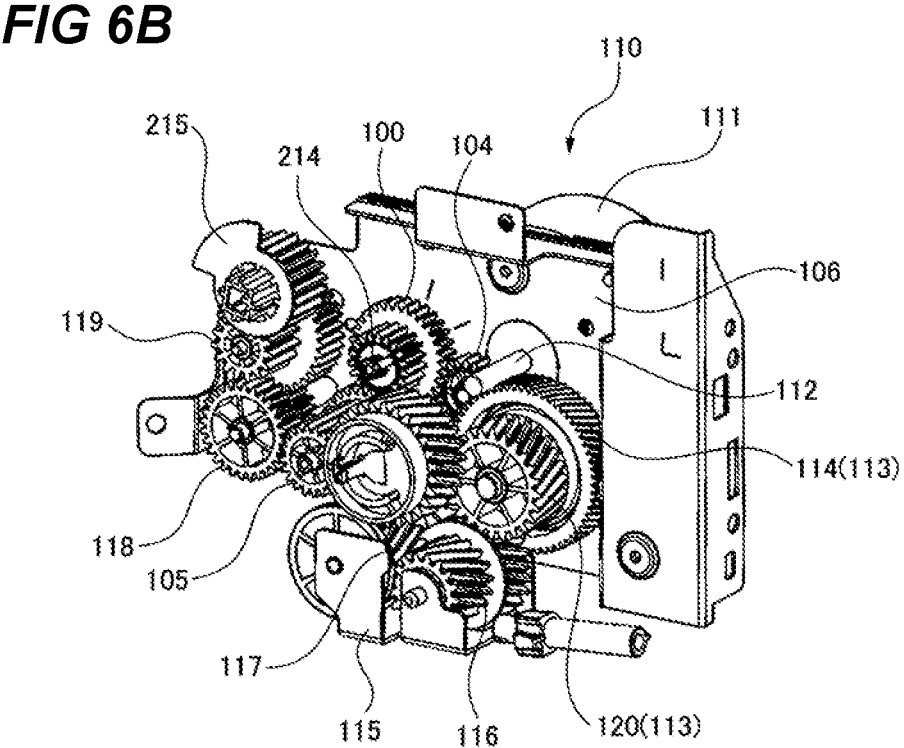

In FIGS. 15A, 15B, 15C, 16A and 16B, parts that have the same configuration as those in FIGS. 6A and 6B are marked with the same symbols and their descriptions will be omitted.

Figure 15A:
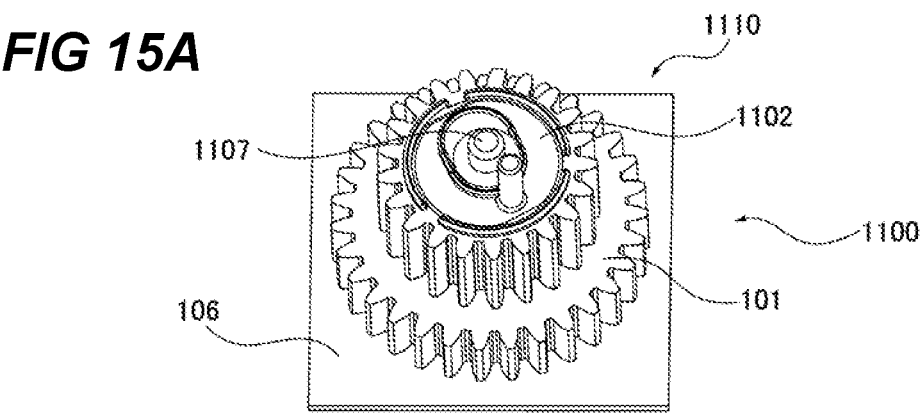
FIGS. 15A, 15B and 15C are diagrams, each showing a perspective view of a swing gear of a drive transmission device according to the second embodiment of the present invention.
Figure 15B:
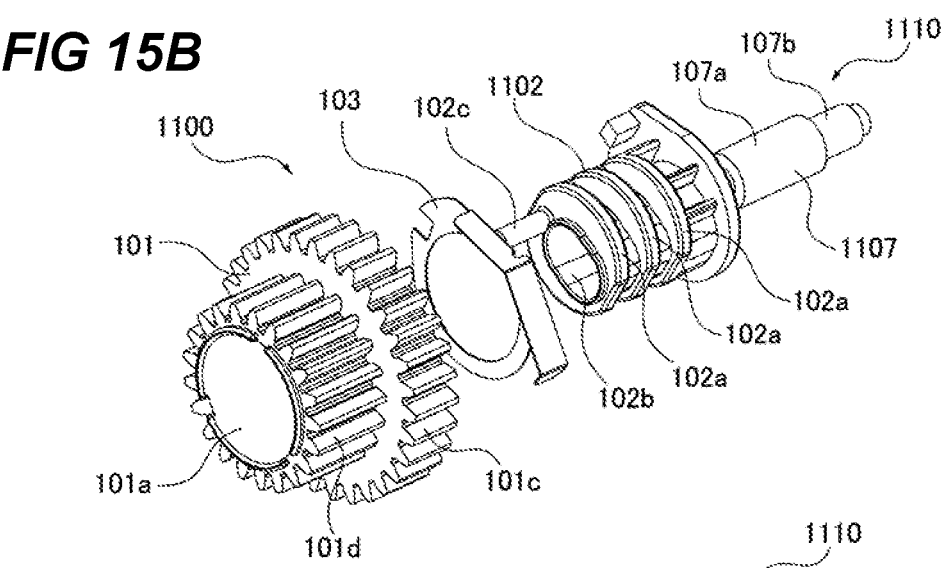
Figure 15C:
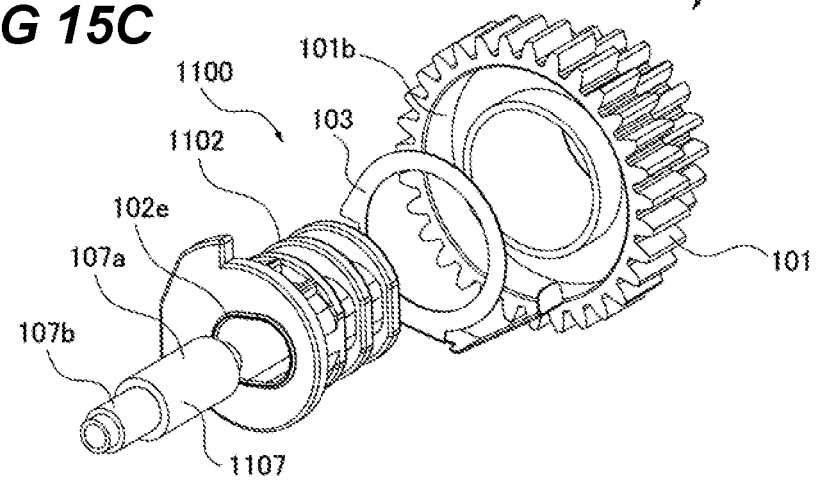

FIG. 15A is a diagram showing a perspective view of the swing gear 1100. FIG. 15B is a diagram showing an exploded perspective view of the swing gear 1100 viewed from the side of the gear member 101. FIG. 15C is a diagram showing an exploded perspective view of the swing gear 1100 viewed from the side of the holder member 1102.

Figure 16A:
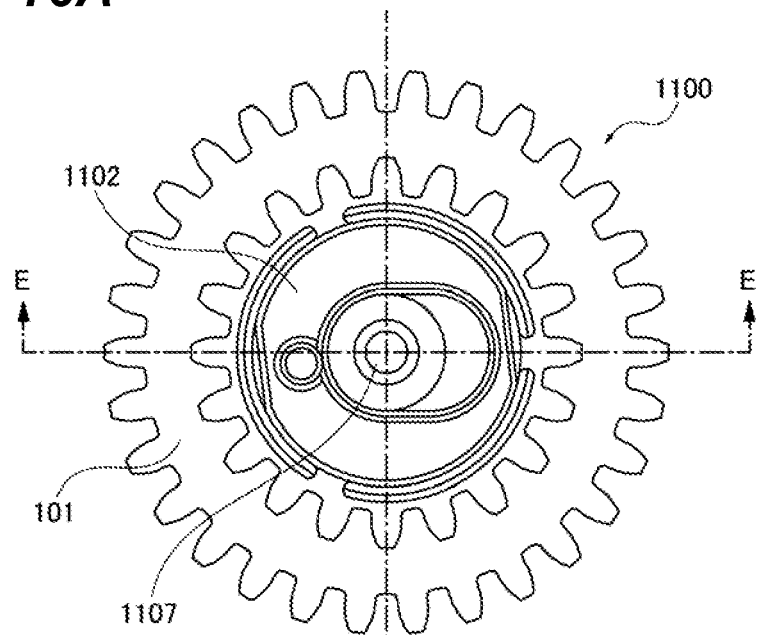
FIGS. 16A and 16B are diagrams, each showing the inner configuration of the swing gear of the drive transmission device according to the second embodiment of the present invention.
Figure 16B:
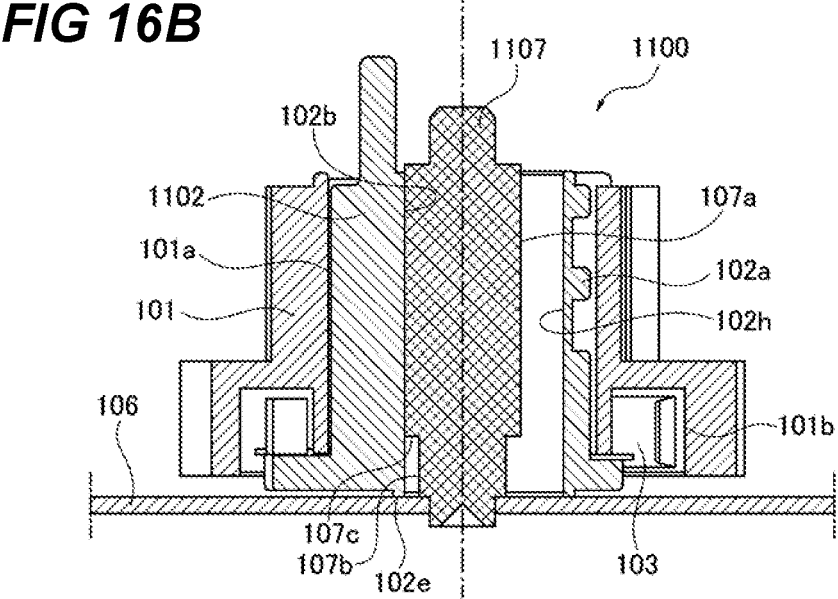

FIG. 16A is a diagram showing the configuration of the swing gear 1100 viewed from the side of the gear 101d, and FIG. 16B is an E-E cross section of FIG. 16A.

The drive transmission device 1110 has the input gear 104, the output gear 105, the support frame 106, the drive cover 108, the motor 111, the motor gear 112, the one-way clutch unit 113, the rocking unit 115, the rocking center gear 116, the swing gear 117, the idler gear 118, the idler gear 119, the swing gear 1100 and the shaft portion 1107.

The swing gear 1100 rocks according to the forward and reverse rotations of the input gear 104 to switch on and off the transmission of the driving force of the motor 111 to the cam gear 215. The configuration of the swing gear 1100 will be described in detail below.

The input gear 104 transmits the driving force transmitted from the motor gear 112 to the swing gear 1100.

The output gear 105 transmits the driving force transmitted from the swing gear 1100 to the idler gear 118.

The shaft portion 1107 protrudes from the support frame 106 and supports the swing gear 1100 in a rockable manner. For providing space between the shaft portion 1107 and the inner circumferential surface 102h of the elongated hole portion 102b, the step portion 107b is provided at the end of the shaft portion 1107 in the axial direction on the side of the support frame 106.

The contact portion 107a as a large diameter portion is a portion other than the end portion on the side of the support frame 106 in the axial direction of the shaft portion 1107, which contacts the inner circumferential surface 102h of the elongated hole portion 102b.

The step portion 107b as a small diameter portion is smaller in diameter than that of the contact portion 107a and does not contact the inner circumferential surface 102h by having a gap between the shaft portion 1107 and the inner circumferential surface 102h of the elongated hole portion 102b. It is desirable that the switching surface 107c is formed such that the switching surface 107c is arranged closer to the support frame 106 than the center position Q of the width of engagement between the gear member 101 of the swing gear 1100 and the input gear 104.

The restricting groove 108a engages with the protruding portion 102c of the holder member 1102 described below, thereby restricting the rocking range of the swing gear 1100.
<Configuration of Swing Gear>

The configuration of the swing gear 1100 of the drive transmission device 110 according to the second embodiment of the present invention will be described in detail with reference to FIGS. 15A, 15B, 15c, 16A and 16B.

In FIGS. 15A, 15B, 15c, 16A and 16B, parts that have the same configuration as those in FIGS. 9A, 9B, 9C, 10, 14A and 14B are marked with the same symbols and their descriptions will be omitted.

The swing gear 1100 includes the gear member 101, the holder member 1102 and the elastic member 103.

The holder member 1102 includes the circular rib 102a, the elongated hole portion 1102b, the protruding portion 102c, and is movably held at the support frame 106.

The elongated hole portion 102b penetrates the holder member 1102 in the axial direction of the gear member 101 and is elongated in the direction perpendicular to the axial direction. The shaft portion 1107 protruding from the support frame 106 is inserted into the elongated hole portion 102b.

In the swing gear 1100 having the above configuration, lubricant is applied to the sliding surfaces of the inner circumferential surface 101a and the rib 102a and to the sliding surfaces of the inner circumferential surface 101b and the elastic member 103 for quietness and wear reduction. Lubricant is also applied in the same manner to the tooth surfaces of gears in the drive transmission device 1110 and the outer circumferential surfaces of the rotating shafts of the gears.

<Operation of the Drive Transmission Device>

The operation of the drive transmission device 1110 of the second embodiment of the present invention will be described in detail with reference to FIGS. 15A, 15B, 15C, 16A and 16B.

The swing gear 1100 couples or decouples the gear member 101 to/from the output gear 105 by switching the direction of rotation of the input gear 104. The swing gear 1100 is held in a rockable manner to the support frame 106 by the shaft portion 1107 protruding from the support frame 106 being inserted into the elongated hole portion 102b of the holder member 1102.

When the drive transmission device 1110 is assembled, the lubricant G applied inside the swing gear 1100 or the drive transmission device 1110 may accidentally adhere to the support frame 106. When the drive transmission device 1110 is operated, the lubricant G may scatter and adhere to the support frame 106.

In contrast, in the drive transmission device 1110, since the step portion 107b is provided at the shaft portion 1107, the contact surface 102e is separated from the inner circumferential surface 102h of the elongated hole portion 102b that the shaft portion 1107 contacts. As a result, the step portion 107b and the inner circumferential surface 102h of the elongated hole portion 102b are distanced from each other, which creates a space between the step portion 107b and the elongated hole portion 102b, thereby preventing the lubricant G from sticking to the inner circumferential surface 102h of the elongated hole portion 102b that the shaft portion 1107 contacts.

When the switching surface 107c of the step portion 107b is closer to the support frame 106 than the center position Q of the width of the engagement of the gear member 101 and the input gear 104, the step portion 107b and the center position Q which is the point of effort, do not overlap with each other. This prevents the holder member 1102 from tilting due to the shaft portion 1107 entering the step portion 107b.

In the present embodiment, the shaft portion 1107 and the inner circumferential surface of the elongated hole portion 102b do not come into contact with each other at the end of the shaft portion 1107 on the side of the support frame 106 in the axial direction of the shaft portion 1107. As a result, the drive operation becomes quieter, abrasion may be reduced, and the switching operation in selectively switching the drives may be stabilized.

In the present embodiment, the gear 101c, which meshes with the input gear 104 of the gear member 101, is closer to the support frame 106 than the gear 101d, which meshes with the output gear 105 of the gear member 101. However, the present invention is not limited to this configuration, and the gear 101d, which meshes with the output gear 105 of the gear member 101, may be closer to the support frame 106 than the gear 101c, which meshes with the input gear 104 of the gear member 101. In this case, the switching surface 107c can be provided in a more upward position in FIG. 16B.

Third Embodiment

The configuration of the image forming apparatus for the third embodiment of the present invention is the same as that shown in FIGS. 1 and 2, so the description thereof will be omitted. The configuration of the fixing device for the present embodiment is the same as that shown in FIGS. 3 to 5, so the description thereof will be omitted. The configuration of the pressure release mechanism for the present embodiment is the same as that shown in FIGS. 4 and 5, so the description of thereof will be omitted. The configuration of the one-way clutch unit for the present embodiment is the same as that shown in FIGS. 7A, 7B, 8A and 8B, so the description of thereof will be omitted.

<Configuration of Drive Transmission Device>

The configuration of the drive transmission device 2110 of the third embodiment of the present invention will be described in detail with reference to FIGS. 17A, 17B, 17c, 18A and 18B.

In FIGS. 17A, 17B, 17c, 18A and 18B, parts that have the same configuration as those in FIGS. 6A and 6B are marked with the same symbols and their descriptions will be omitted.

Figure 17A:
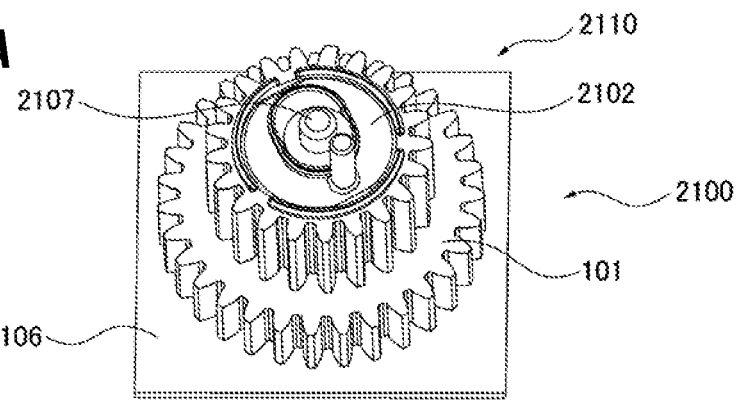
FIGS. 17A, 17B and 17C are diagrams, each showing a perspective view of a swing gear of a drive transmission device according to the third embodiment of the present invention.
Figure 17B:
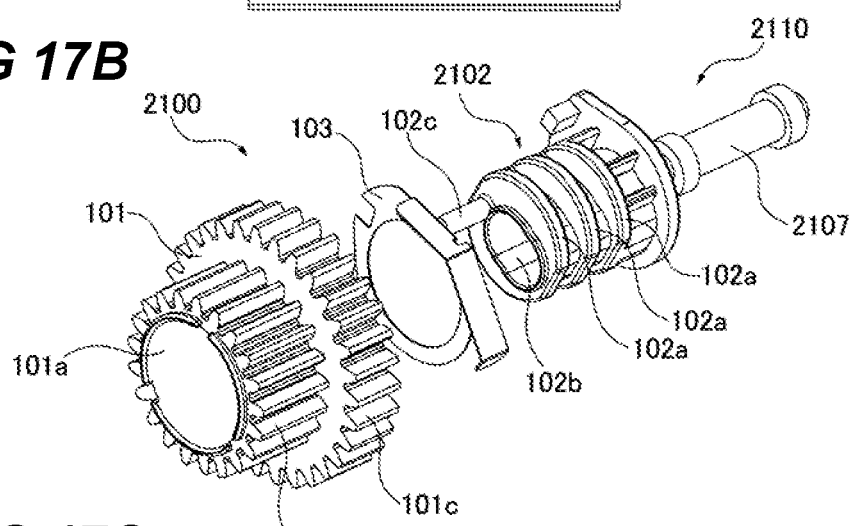
Figure 17C:
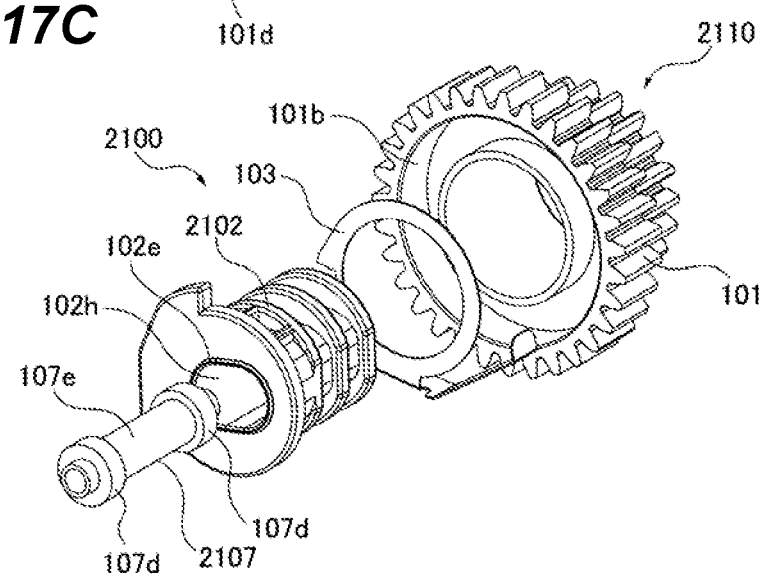

FIG. 17A is a diagram showing a perspective view of the swing gear 2100. FIG. 17B is a diagram showing an exploded perspective view of the swing gear 2100 viewed from the side of the gear member 101. FIG. 17C is a diagram showing an exploded perspective view of the swing gear 2100 viewed from the side of the holder member 2102.

Figure 18A:
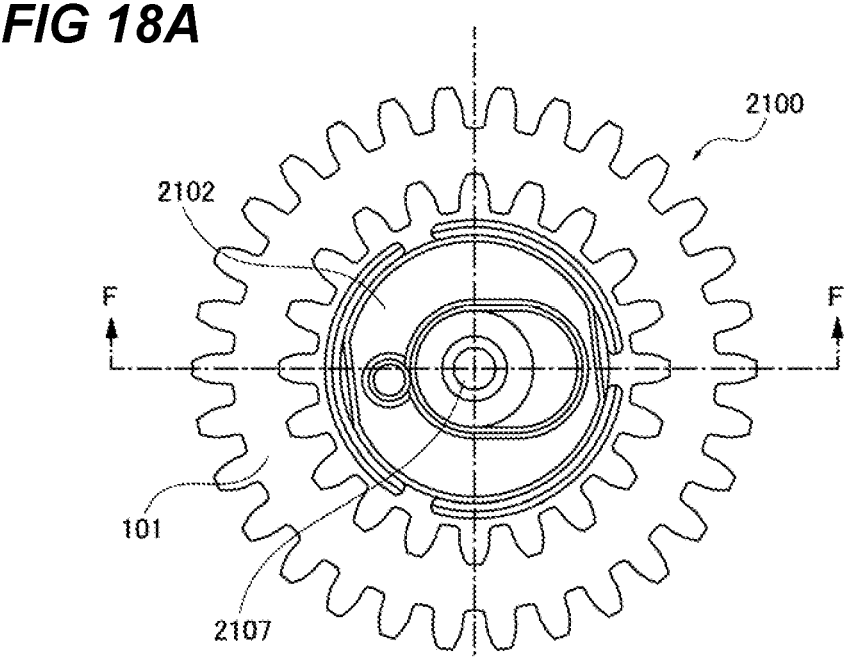
FIGS. 18A and 18B are diagrams, each showing the inner configuration of the swing gear of the drive transmission device according to the third embodiment of the present invention.
Figure 18B:
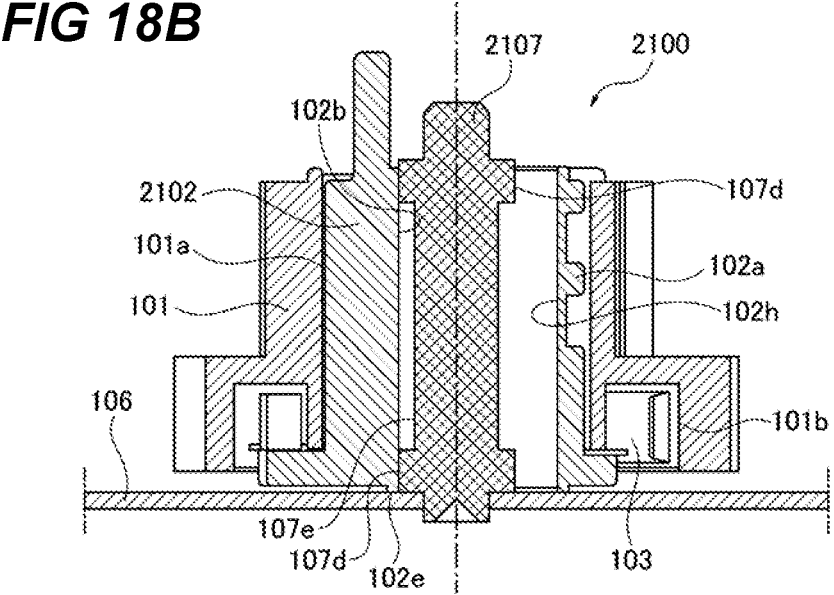

FIG. 18A is a diagram showing the configuration of the swing gear 2100 viewed from the side of the gear 101d, and FIG. 18B is an F-F cross section of FIG. 18A.

The drive transmission device 2110 has the input gear 104, the output gear 105, the support frame 106, the drive cover 108, the motor 111, the motor gear 112, the one-way clutch unit 113, the rocking unit 115, the rocking center gear 116, the swing gear 117, the idler gear 118, the idler gear 119, the swing gear 2100 and the shaft portion 2107.

The swing gear 2100 rocks according to the forward and reverse rotation of the input gear 104 to switch on and off the transmission of the driving force of the motor 111 to the cam gear 215. The configuration of the swing gear 2100 will be described in detail below.

The input gear 104 transmits the driving force transmitted from the motor gear 112 to the swing gear 2100.

The output gear 105 transmits the driving force transmitted from the swing gear 2100 to the idler gear 118.

The shaft portion 2107 protrudes from the support frame 106 and supports the swing gear 2100 in a rockable manner. For providing space between the shaft portion 2107 and the inner circumferential surface 102h of the elongated hole portion 102b, the step portion 107e is provided at the center of the shaft portion 2107 in the axial direction.

The diameter of the step portion 107e is less than that of the end portion 107d of the shaft portion 2107 in the axial direction. The end portion 107d is the portion of the shaft portion 2107 other than the step portion 107e. The step portion 107e does not contact the inner circumferential surface 102h by having a gap between the shaft portion 2107 and the inner circumferential surface 102h.

The restricting groove 108a engages with the protruding portion 102c of the holder member 2102, thereby restricting the rocking range of the swing gear 2100.

<Configuration of Swing Gear>

The configuration of the swing gear 2100 of the drive transmission device according to the third embodiment of the present invention will be described in detail with reference to 17A, 17B, 17C, 18A and 18B.

In FIGS. 17A, 1B, 17C, 18A and 18B, parts that have the same configuration as those in FIGS. 9A, 9B, 9C, 10, 14A and 14B are marked with the same symbols and their descriptions will be omitted.

The swing gear 2100 includes the gear member 101, the holder member 2102 and the elastic member 103.

The holder member 2102 includes the circular rib 102a, the elongated hole portion 1102b, the protruding portion 102c, and is movably held at the support frame 106.

The elongated hole portion 102b penetrates the holder member 2102 in the axial direction of the gear member 101 and is elongated in the direction perpendicular to the axial direction. The shaft portion 2107 protruding from the support frame 106 is inserted into the elongated hole portion 102b.

In the swing gear 2100 having the above configuration, lubricant is applied to the sliding surfaces of the inner circumferential surface 101a and the rib 102a and to the sliding surfaces of the inner circumferential surface 101b and the elastic member 103 for quietness and wear reduction. Lubricant is also applied in the same manner to the tooth surfaces of gears in the drive transmission device 2110 and the outer circumferential surfaces of the rotating shafts of the gears.

<Operation of the Drive Transmission Device>

The operation of the drive transmission device 2110 of the third embodiment of the present invention will be described in detail with reference to FIGS. 17A, 17B, 17C, 18A and 18B.

The swing gear 2100 couples or decouples the gear member 101 to/from the output gear 105 by switching the direction of rotation of the input gear 104. The swing gear 2100 is held in a rockable manner to the support frame 106 by the shaft portion 2107 protruding from the support frame 106 being inserted into the elongated hole portion 102b of the holder member 2102.

When the drive transmission device 2110 is assembled, the lubricant G applied inside the swing gear 2100 or the drive transmission device 2110 may accidentally adhere to the support frame 106. When the drive transmission device 2110 is operated, the lubricant G may scatter and adhere to the support frame 106.

If lubricant G accidentally adheres to the outer circumference of the shaft portion 2107 during assembly of the drive transmission device 2110, it can cause operation failure of the swing gear 2100. However, the drive transmission device 2110 is equipped with the step portion 107e on the shaft potion 2107, so that most of the outer circumferential surface of the shaft portion 2107 is the step portion 107e and a gap is created between the shaft portion 2107 and the inner circumferential surface 102h of the elongated hole portion 102b of the holder member 2102. This configuration can greatly reduce the possibility of lubricant G adhering to the end portion 107d of the shaft portion 2107.

Since the end portion 107d of the shaft portion 2107 contacts the inner circumferential surface 102h of the elongated hole portion 102b of the holder member 2102, there is no concern that the holder member 2102 will fall.

Since the contact surface 102e, the elongated hole portion 102b, and the end portion 107d of the shaft portion 2107 are continuous to each other, the lubricant G may go around from the support frame 106 to the end portion 107d of the shaft portion 2107 if it adheres to the support frame 106. When taking into the runabout of the lubricant G, the rocking force of the swing gear 2100 should be greater than the adhesion force between the end portion 107d of the shaft portion 2107 and the inner circumferential surface of the elongated hole portion 102b. For example, the urging force of the elastic member 103 should be increased or the length of contact between the end portion 107d of the shaft portion 2107 on the side of the support frame 106 and the inner circumferential surface of the elongated hole portion 102b should be reduced.

In the present embodiment, the shaft portion 2107 and the inner circumferential surface of the elongated hole portion 102b do not come into contact with each other at the center portion of the shaft portion 2107 in the axial direction of the shaft portion 2107. As a result, the drive operation becomes quieter, abrasion may be reduced, and the switching operation in selectively switching the drives may be stabilized.

In the present embodiment, the gear 101c, which meshes with the input gear 104 of the gear member 101, is closer to the support frame 106 than the gear 101d, which meshes with the output gear 105 of the gear member 101. However, the present invention is not limited to this configuration, and the gear 101d, which meshes with the output gear 105 of the gear member 101, may be closer to the support frame 106 than the gear 101c, which meshes with the input gear 104 of the gear member 101.

Fourth Embodiment

The configuration of the image forming apparatus according to the fourth embodiment of the present invention is the same as that shown in FIGS. 1 and 2, so the description thereof will be omitted. The configuration of the fixing device for the present embodiment is the same as that shown in FIGS. 3 to 5, so the description thereof will be omitted. The configuration of the pressure release mechanism for the present embodiment is the same as that shown in FIGS. 4 and 5, so the description of thereof will be omitted. The configuration of the one-way clutch unit for the present embodiment is the same as that shown in FIGS. 7A, 7B, 8A and 8B, so the description of thereof will be omitted.

<Configuration of Drive Transmission Device>

The configuration of the drive transmission device 3110 of the fourth embodiment of the present invention will be described in detail with reference to FIGS. 19A, 19B, 19C, 20A and 20B.

In FIGS. 19A, 19B, 19C, 20A and 20B, parts that have the same configuration as those in FIGS. 6A and 6B are marked with the same symbols and their descriptions will be omitted.

Figure 19A:
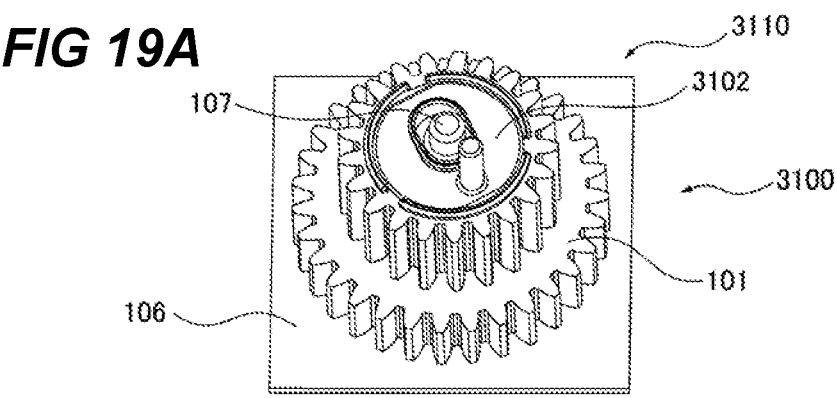
FIGS. 19A, 19B and 19C are diagrams, each showing a perspective view of a swing gear of a drive transmission device according to the fourth embodiment of the present invention.
Figure 19B:
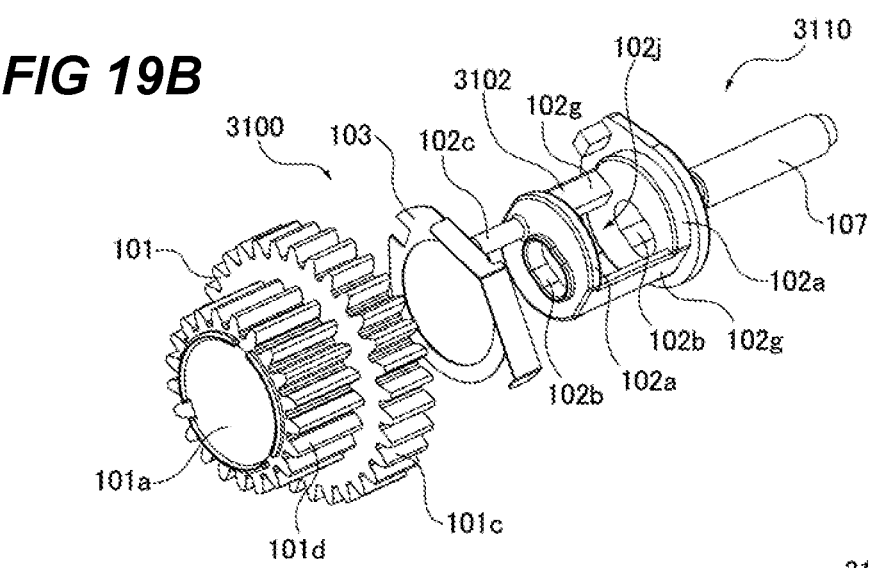
Figure 19C:
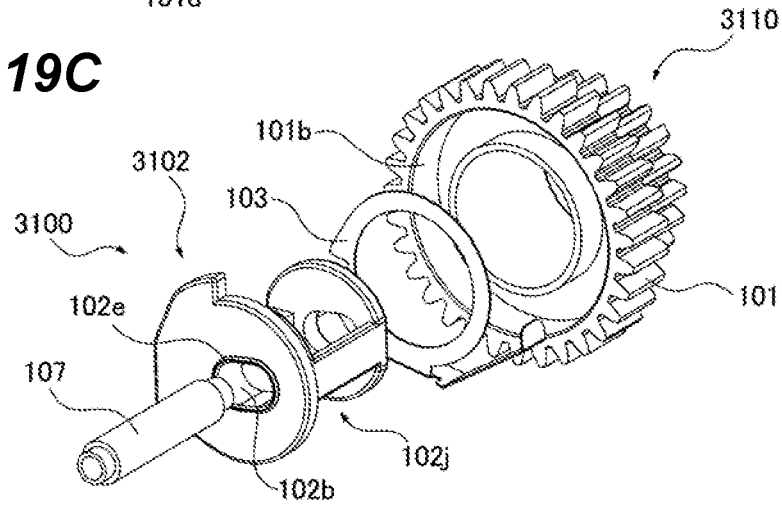

FIG. 19A is a diagram showing a perspective view of the swing gear 3100. FIG. 19B is a diagram showing an exploded perspective view of the swing gear 3100 viewed from the side of the gear member 101. FIG. 19C is a diagram showing an exploded perspective view of the swing gear 3100 viewed from the side of the holder member 3102.

Figure 20A:
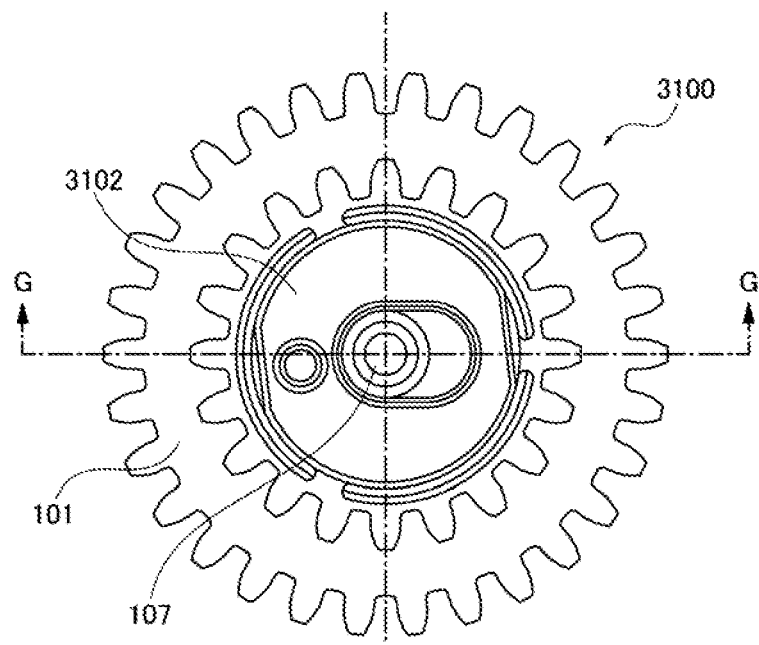
FIGS. 20A and 20B are diagrams, each showing the inner configuration of the swing gear of the drive transmission device according to the fourth embodiment of the present invention.
Figure 20B:
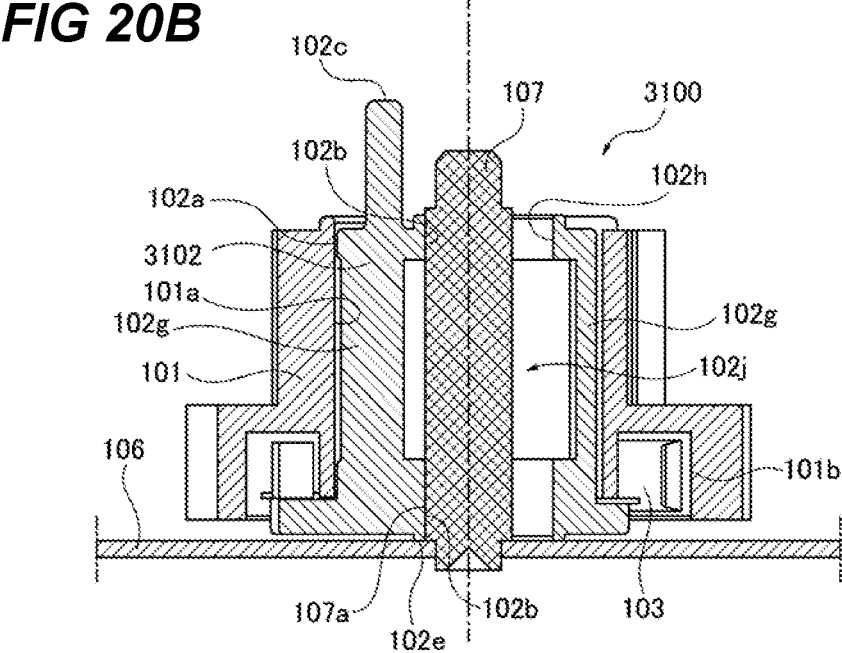
Figure 21A:
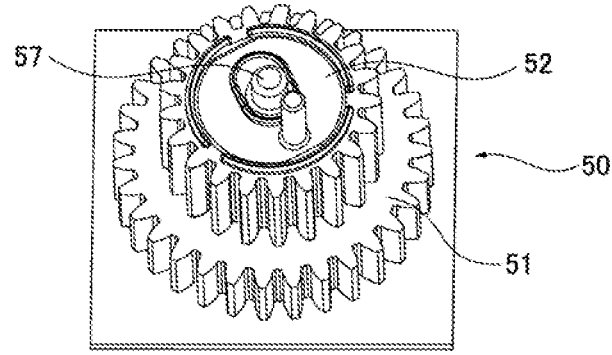
FIGS. 21A, 21B and 21C are diagrams, each showing a perspective view of a swing gear of a conventional drive transmission device.
Figure 21B:
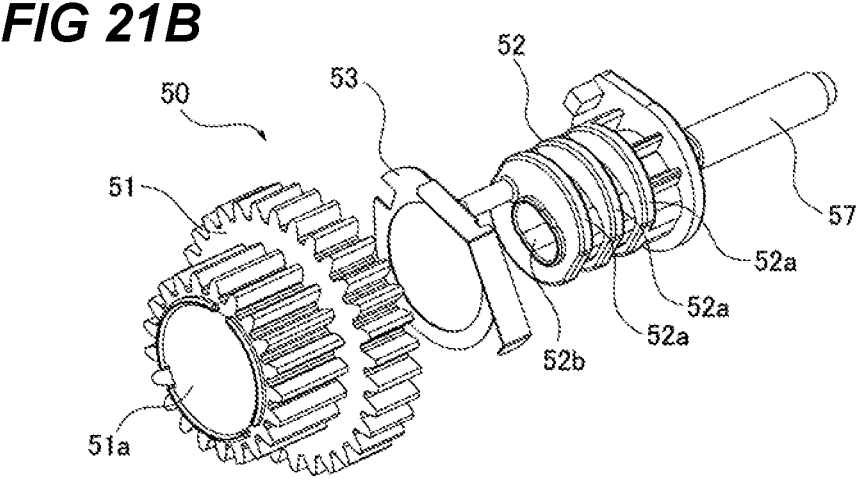
Figure 21C:
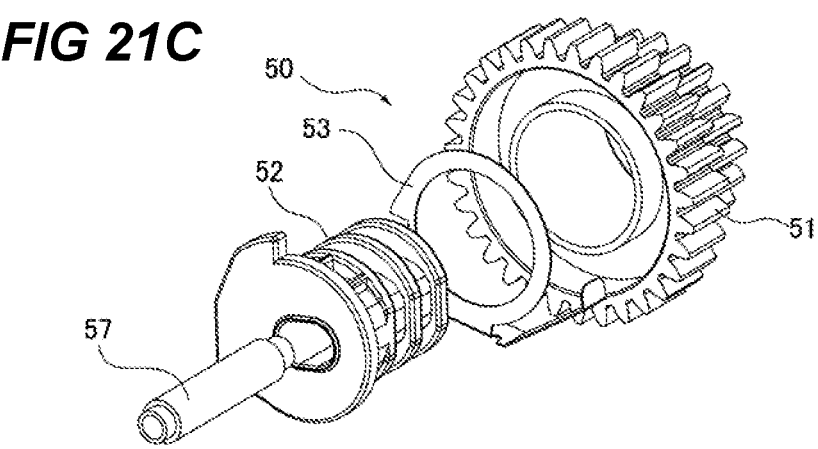

FIG. 20A is a diagram showing the configuration of the swing gear 3100 viewed from the side of the gear 101d, and FIG. 20B is a G-G cross section of FIG. 20A.

The drive transmission device 3110 has the input gear 104, the output gear 105, the support frame 106, the drive cover 108, the motor 111, the motor gear 112, the one-way clutch unit 113, the rocking unit 115, the rocking center gear 116, the swing gear 117, the idler gear 118, the idler gear 119, the swing gear 3100 and the shaft portion 107.

The swing gear 3100 rocks according to the forward and reverse rotation of the input gear 104 to switch on and off the transmission of the driving force of the motor 111 to the cam gear 215. The configuration of the swing gear 3100 will be described in detail below.

The input gear 104 transmits the driving force transmitted from the motor gear 112 to the swing gear 3100.

The output gear 105 transmits the driving force transmitted from the swing gear 3100 to the idler gear 118.

The shaft portion 107 protrudes from the support frame 106 and supports the swing gear 3100 in a rockable manner.

The restricting groove 108a engages with the protruding portion 102c of the holder member 3102 described below, thereby restricting the rocking range of the swing gear 3100.

<Configuration of Swing Gear>

The configuration of the swing gear 3100 of the drive transmission device according to the fourth embodiment of the present invention will be described in detail with reference to FIGS. 19A, 19B, 19C, 20A and 20B.

In FIGS. 19A, 19B, 19C, 20A and 20B, parts that have the same configuration as those in FIGS. 9A, 9B, 9C, 10, 14A and 14B are marked with the same symbols and their descriptions will be omitted.

The swing gear 3100 includes the gear member 101, the holder member 3102 and the elastic member 103.

The holder member 3102 includes the circular rib 102a, the elongated hole portion 1102b, the protruding portion 102c, the connecting portion 102g and the communication hole 102j, and is movably held at the support frame 106.

The connecting portions 102g connect the ribs 102a at both ends of the shaft portion 107 in the axial direction. The communication hole 102j is formed between the adjacent connecting portions 102g to communicate the inside of the holder member 3102 with the outside.

The communicating hole 102j is provided at the center portion of the inner surface 102h of the holder member 3102 in the axial direction of the shaft portion 2107. As a result, the shaft portion 2107 inserted into the elongated hole portion 1102b is exposed to the outside, and the inner circumferential surface 102h is not in contact with the shaft portion 2107.

In the swing gear 3100 having the above configuration, lubricant is applied to the sliding surfaces of the inner circumferential surface 101a and the rib 102a and to the sliding surfaces of the inner circumferential surface 101b and the elastic member 103 for quietness and wear reduction. Lubricant is also applied in the same manner to the tooth surfaces of gears in the drive transmission device 3110 and the outer circumferential surfaces of the rotating shafts of the gears.

<Operation of the Drive Transmission Device>

The operation of the drive transmission device 3110 of the fourth embodiment of the present invention will be described in detail with reference to FIGS. 19A, 19B, 19C, 20A and 20B.

The swing gear 3100 couples or decouples the gear member 101 to/from the output gear 105 by switching the direction of rotation of the input gear 104. The swing gear 3100 is held in a rockable manner to the support frame 106 by the shaft portion 107 protruding from the support frame 106 being inserted into the elongated hole portion 102b of the holder member 3102.

When the drive transmission device 3110 is assembled, the lubricant G applied inside the swing gear 3100 or the drive transmission device 3110 may accidentally adhere to the support frame 106. When the drive transmission device 3110 is operated, the lubricant G may scatter and adhere to the support frame 106.

In contrast, the drive transmission device 3110 communicates most of the inside space of the holder member 3102 with the outside by means of the communicating hole 102j. This greatly reduces the possibility of the lubricant G adhering to the outer circumferential surface of the shaft portion 107 that is in contact with the inner circumferential surface 102h of the elongated hole portion 102b when the lubricant G accidentally adheres to the outer circumferential surface of the shaft portion 107 during the assembly of the drive transmission device 3110. Further, even when a large amount of the lubricant G is attached, the drive operation becomes quieter, abrasion may be reduced, and the switching operation in selectively switching the drives may be stabilized.

Since both end portions of the inner circumferential surface of the elongated hole portion 102b in the axial direction contact the outer circumferential surface of the shaft portion 107, there is no concern that the holder member 3102 will fall.

Since the contact surface 102e, the elongated hole portion 102b, and the end portion 107d of the shaft portion 107 in the axial direction are continuous to each other, the lubricant G may go around from the support frame 106 to the end portion of the shaft portion 107 in the axial direction if it adheres to the support frame 106. When taking into the runabout of the lubricant G, the rocking force of the swing gear 3100 should be greater than the adhesion force between the shaft portion 107 and the inner circumferential surface of the elongated hole portion 102b. For example, the urging force of the elastic member 103 should be increased or the length of contact between the end portion of the shaft portion 107 on the side of the support frame 106 in the axial direction and the inner circumferential surface of the elongated hole portion 102b should be reduced.

In the present embodiment, the shaft portion 107 and the inner circumferential surface of the elongated hole portion 102b do not come into contact with each other at the center portion of the shaft portion 107 in the axial direction of the shaft portion 107. As a result, the drive operation becomes quieter, abrasion may be reduced, and the switching operation in selectively switching the drives may be stabilized.

In the present embodiment, the gear 101c, which meshes with the input gear 104 of the gear member 101, is closer to the support frame 106 than the gear 101d, which meshes with the output gear 105 of the gear member 101. However, the present invention is not limited to this configuration, and the gear 101d, which meshes with the output gear 105 of the gear member 101, may be closer to the support frame 106 than the gear 101c, which meshes with the input gear 104 of the gear member 101.

The present invention is not limited to the above embodiments, but can be transformed in various ways without departing from the gist thereof.

Specifically, in the first to fourth embodiments above, with the drive transmission device, the pressuring roller 201 contacts the fixing film 204 or the pressuring roller 201 is separated from the fixing film 204 while the pressuring roller 201 is driven to rotate. However, the present invention is not limited to this configuration. With the drive transmission device, another pair of rotating members other than the pressuring roller 201 and the fixing film 204 contact to each other or the rotating members are separated from each other while one of the rotating members is driven to rotate.

The first to fourth embodiments above include the following configurations

Configuration 1

A drive transmission device, comprising:
an input gear configured to rotate by a driving force from a driving source;
a swing gear configured to rotate by a driving force from the input gear, the swing gear being located at a first position when the input gear is rotated in a forward direction and located at a second position that is different from the first position when the input gear is rotated in a backward direction that is a direction opposite to the forward direction;
an output gear configured to separate from the swing gear when the swing gear is located at the first position, and that is in contact with the swing gear to be rotated by rotation of the swing gear when the swing gear is located at the second position; and
a shaft portion configured to support the swing gear such that the swing gear is movable between the first position and the second position,
wherein the swing gear has a guide hole into which the shaft portion is inserted, and
wherein an inner circumferential surface of the guide hole includes:
a first contact portion configured to contact with the shaft portion when the swing gear is located at the first position;
a first non-contact portion configured to provide alongside the first contact portion in a cross section in an axial direction of the shaft portion, the cross section passing through the first contact portion, the first non-contact portion being configured not to be in contact with the shaft portion when the swing gear is located at the first position;
a second contact portion configured to contact with the shaft portion when the swing gear is located at the second position; and
a second non-contact portion configured to provide alongside the second contact portion in a cross section in the axial direction, the cross section passing through the second contact portion, the second non-contact portion being configured not to be in contact with the shaft portion when the swing gear is located at the second position.

Configuration 2

The drive transmission device according to configuration 1,
wherein the first non-contact portion and the second non-contact portion are grooves.

Configuration 3

The drive transmission device according to configuration 2,
wherein the grooves as the first non-contact portion and the second non-contact portion are continuous to each other.

Configuration 4

The drive transmission device according to configuration 1,
wherein the shaft portion includes a large diameter portion that can be in contact with the inner circumferential surface and a small diameter portion whose outer diameter is smaller than that of the large diameter portion and that is not in contact with the inner circumferential surface.

Configuration 5

A fixing device, comprising:
the drive transmission device according to configuration 1,
a first rotating member configured to rotate by the driving source, and
a second rotating member configured to contact with the first rotating member,
wherein the second rotating member is configured to fix a toner image on a recording material in cooperation with the first rotating member.

Configuration 6

An image forming apparatus comprising:
the fixing device according to configuration 5,
wherein the first rotating member is driven to rotate when the input gear rotates in the forward direction and the first rotating member is not driven to rotate when the input gear rotates in the backward direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-147897, filed Sep. 16, 2022, which is hereby incorporated by reference herein in its entirety.

What is claimed is:

1. A drive transmission device, comprising:
an input gear configured to rotate by a driving force from a driving source;
a swing gear configured to rotate by a driving force from the input gear, the swing gear being located at a first position when the input gear is rotated in a forward direction and located at a second position that is different from the first position when the input gear is rotated in a backward direction that is a direction opposite to the forward direction;
an output gear configured to separate from the swing gear when the swing gear is located at the first position, and that is in contact with the swing gear to be rotated by rotation of the swing gear when the swing gear is located at the second position; and
a shaft portion configured to support the swing gear such that the swing gear is movable between the first position and the second position,
wherein the swing gear has a guide hole into which the shaft portion is inserted, and
wherein an inner circumferential surface of the guide hole includes:
a first contact portion configured to contact with the shaft portion when the swing gear is located at the first position;
a first non-contact portion configured to provide alongside the first contact portion in a cross section in an axial direction of the shaft portion, the cross section passing through the first contact portion, the first non-contact portion being configured not to be in contact with the shaft portion when the swing gear is located at the first position;

a second contact portion configured to contact with the shaft portion when the swing gear is located at the second position; and a second non-contact portion configured to provide alongside the second contact portion in a cross section in the axial direction, the cross section passing through the second contact portion, the second non-contact portion being configured not to be in contact with the shaft portion when the swing gear is located at the second position.

2. The drive transmission device according to claim 1,
wherein the first non-contact portion and the second non-contact portion are grooves.

3. The drive transmission device according to claim 2,
wherein the grooves as the first non-contact portion and the second non-contact portion are continuous to each other.

4. The drive transmission device according to claim 1,
wherein the shaft portion includes a large diameter portion that can be in contact with the inner circumferential surface and a small diameter portion whose outer diameter is smaller than that of the large diameter portion and that is not in contact with the inner circumferential surface.

5. A fixing device, comprising:
the drive transmission device according to claim 1,
a first rotating member configured to rotate by the driving source, and
a second rotating member configured to contact with the first rotating member,
wherein the second rotating member is configured to fix a toner image on a recording material in cooperation with the first rotating member.

6. An image forming apparatus comprising:
the fixing device according to claim 5,
wherein the first rotating member is driven to rotate when the input gear rotates in the forward direction and the first rotating member is not driven to rotate when the input gear rotates in the backward direction.

* * * * *